United States Patent
Hagiwara et al.

(10) Patent No.: US 9,007,631 B2
(45) Date of Patent: Apr. 14, 2015

(54) SYSTEM, APPARATUS AND METHOD FOR MANAGING HETEROGENEOUS GROUP OF DEVICES

(71) Applicants: Kenji Hagiwara, Edgewater, NJ (US); Jim Vopni, Kitchener (CA); Shun Tanaka, West New York, NJ (US)

(72) Inventors: Kenji Hagiwara, Edgewater, NJ (US); Jim Vopni, Kitchener (CA); Shun Tanaka, West New York, NJ (US)

(73) Assignee: Ricoh Company, Ltd., Tokyo (JP)

( * ) Notice: Subject to any disclaimer, the term of this patent is extended or adjusted under 35 U.S.C. 154(b) by 238 days.

(21) Appl. No.: 13/758,097

(22) Filed: Feb. 4, 2013

(65) Prior Publication Data
US 2014/0223315 A1    Aug. 7, 2014

(51) Int. Cl.
G06F 15/00 (2006.01)
G06K 1/00 (2006.01)
G06F 3/12 (2006.01)
H04L 12/24 (2006.01)

(52) U.S. Cl.
CPC .............. H04L 41/22 (2013.01); H04L 41/085 (2013.01)

(58) Field of Classification Search
None
See application file for complete search history.

(56) References Cited

U.S. PATENT DOCUMENTS

| | | | |
|---|---|---|---|
| 7,716,134 B2 * | 5/2010 | Black et al. ................ 705/43 | |
| 8,352,477 B2 | 1/2013 | Uchida et al. | |
| 2002/0174209 A1 * | 11/2002 | Sesek et al. ............... 709/223 | |
| 2003/0145128 A1 * | 7/2003 | Baird et al. ................ 709/321 | |
| 2003/0217201 A1 * | 11/2003 | Gargi et al. ................ 710/16 | |
| 2004/0153688 A1 * | 8/2004 | Yamamoto et al. .......... 714/1 | |
| 2005/0134902 A1 * | 6/2005 | Mihira et al. ............ 358/1.15 | |
| 2008/0205289 A1 * | 8/2008 | Conoboy ................... 370/252 | |
| 2009/0147299 A1 | 6/2009 | Tetu | |
| 2009/0265482 A1 * | 10/2009 | Abe et al. ................... 710/8 | |
| 2010/0235642 A1 * | 9/2010 | Ota et al. ................. 713/175 | |
| 2011/0173270 A1 | 7/2011 | Uchida et al. | |
| 2011/0225493 A1 | 9/2011 | Uchida et al. | |
| 2011/0225501 A1 | 9/2011 | Uchida et al. | |
| 2011/0225504 A1 | 9/2011 | Uchida et al. | |
| 2011/0225627 A1 | 9/2011 | Uchida et al. | |
| 2012/0140255 A1 | 6/2012 | Tanaka | |
| 2012/0167185 A1 * | 6/2012 | Menezes et al. ................ 726/5 | |
| 2012/0191806 A1 | 7/2012 | Tanaka | |
| 2012/0218570 A1 | 8/2012 | Tanaka et al. | |
| 2012/0218578 A1 | 8/2012 | Tanaka | |
| 2012/0221901 A1 | 8/2012 | Tanaka | |
| 2012/0221954 A1 | 8/2012 | Tanaka | |
| 2012/0265865 A1 * | 10/2012 | Tanaka et al. ............... 709/223 | |
| 2012/0266073 A1 | 10/2012 | Tanaka et al. | |

OTHER PUBLICATIONS

Kevin Tetu, "FMAudit Product Line: Technical White Paper", FMAudit, LLC., Oct. 2006.
U.S. Appl. No. 13/370,455, Shun Tanaka et al., filed Feb. 10, 2012.
U.S. Appl. No. 13/370,481, Yuki Uchida et al., filed Feb. 10, 2012.
U.S. Appl. No. 13/595,885, Yuki Uchida et al., filed Aug. 27, 2012.

(Continued)

Primary Examiner — Ming Hon
(74) Attorney, Agent, or Firm — Cooper & Dunham LLP

(57) ABSTRACT

Systems, apparatuses and methods are provided for managing information technology devices in an information technology environment in which at least some of the devices are connected to a network, and settings information is collected from the IT devices and device settings are presented to a user for configuration.

20 Claims, 24 Drawing Sheets

(56) References Cited

OTHER PUBLICATIONS

U.S. Appl. No. 13/685,849, Yuki Uchida et al., filed Nov. 27, 2012.
U.S. Appl. No. 13/758,082, Kenji Hagiwara et al., filed Feb. 4, 2013.
U.S. Appl. No. 13/758,089, Kenji Hagiwara et al., filed Feb. 4, 2013.
U.S. Appl. No. 13/758,103, Shun Tanaka et al., filed Feb. 4, 2013.
U.S. Appl. No. 13/758,116, Greg Melendez et al., filed Feb. 4, 2013.
U.S. Appl. No. 13/758,110, Greg Anderson et al., filed Feb. 4, 2013.

* cited by examiner

| DEVICE SETTINGS INFORMATION (Printer 202A) | | | |
|---|---|---|---|
| Setting Name | Setting Type | Default Value | Options |
| Paper Size | Print | Letter | A4, Legal, Letter, Executive, A5, A6, B5, B6 |
| Duplex | Print | No | Yes, No |
| Pages Per Sheet | Print | 1 | 1, 2-in-1, 4-in-1, 9-in-1, 16-in-1, 25-in-1, 1 in 2x2 pages, 1 in 3x3 pages, 1 in 4x4 pages, 1 in 5x5 pages |
| Orientation | Print | Portrait | Portrait, Landscape |
| ... | ... | ... | ... |
| Time Zone | Date/Time | GMT − 05:00 | GMT, GMT + 01:00, GMT + 02:00 ... GMT − 01:00 |

Fig. 5A

| Device ID | Name | Manufacturer | IP address | Device Age | Status | Firmware Version | Department |
|---|---|---|---|---|---|---|---|
| | | | DEVICE INFORMATION | | | | |
| 1 | MFP 303A-1 | Company A | 172.16.121.255 | 2 years | Maximum storage capacity reached | 10.2.1 | IT |
| 2 | Printer 303A-2 | Company B | 172.16.121.23 | 3 years | Ready | 2.009 | Accounting |
| 3 | Scanner 303A-3 | Company A | 172.16.121.25 | 6 months | Sleep mode | 11.1.1 | Legal |

Fig. 5B

Configure Device – Device Management Tools (v1.0)

| Status | Print Settings | TCP/IP | SNMP | Firmware |

Printing Templates:
- General Printing
- Duplex Printing
- Legal Document Printing

[ Save as ] [ Delete ]

Paper Source: [ Automatically Select ▶ ]

Stapling: [ None ▶ ]

Hole Punching: [ None ▶ ]

Paper Size: [ A4 ▶ ]

Orientation: [ Portrait ▶ ]

Print on both sides: [ 1 Sided Print ▶ ]

Pages per sheet: [ 1 Page Per Sheet ▶ ]

Offset Stacking: [ None ▶ ]

☑ Apply To All Similar Devices

[ OK ] [ Cancel ] [ Help ]

Fig. 9A

Configure Device – Device Management Tools (v1.0)

Print | Status | TCP/IP | SNMP | Firmware

Status Summary

| Parameter | Count |
|---|---|
| Color copied | 109 |
| B/W copied | 1205 |
| Total copied | 1314 |
| Color printed | 308 |
| B/W printed | 5098 |
| Double-side printed | 2124 |
| Total printed | 5406 |
| FAX transmission | 350 |
| Scanner transmission | 814 |
| Transmission total | 1164 |

OK | Cancel | Help

Fig. 9C

| Device Make | Plugin |
|---|---|
| Company A | Plugin A |
| Company B | Plugin B |
| Company C | Plugin C |
| Company D | |
| Company E | |
| Company F | |
| Company G | |
| Company H | |
| Other | Plugin D |

Fig. 10A

| | DEVICE SETTINGS ITEMS INFORMATION | | | | |
| --- | --- | --- | --- | --- | --- |
| | Network-Connected Device | | | | USB-Connected Device |
| | SNMP | | Plugin B | Plugin C | MIB Agent |
| | Standard MIB | Company A Private MIB | | | |
| System status | ✓ | ✓ | ✓ | ✓ | ✓ |
| Printer status | ✓ | ✓ | ✓ | ✓ | ✓ |
| Copy status | | ✓ | ✓ | | |
| FAX status | | ✓ | ✓ | | |
| Scanner status | ✓ | | | | |
| Vendor name | ✓ | ✓ | ✓ | ✓ | ✓ |
| PPM | ✓ | ✓ | | | |
| Monochrome/color | ✓ | ✓ | | | ✓ |
| System version | ✓ | ✓ | | | ✓ |
| Printer version | ✓ | ✓ | ✓ | ✓ | ✓ |
| Serial number | ✓ | | ✓ | ✓ | ✓ |
| Total memory | ✓ | ✓ | | | |
| Printer language | ✓ | | | ✓ | ✓ |
| IP address | ✓ | | ✓ | ✓ | ✓ |
| MAC address | ✓ | | | ✓ | ✓ |

Fig. 10B

SYSTEM, APPARATUS AND METHOD FOR MANAGING HETEROGENEOUS GROUP OF DEVICES

TECHNICAL FIELD

This disclosure relates to tools (such as systems, apparatuses, methodologies, computer program products, etc.) for managing information technology devices, and more particularly, for managing a heterogeneous group of devices (such as, for example, from multiple manufacturers).

BACKGROUND

In the current information age, information technology (IT) tools are extensively used in enterprises and other organizations in order to facilitate processing of documents and data.

IT administrators typically have the responsibilities of monitoring and managing IT devices, such as computers, printers, scanners, multi-function devices (MFDs) and other network-connected or standalone devices. Device management tools (such as application software, etc.) are available to IT administrators to assist the administrators to track, monitor and otherwise manage the devices. Such device management tools retrieve device settings information from the IT devices through a network and allow the IT administrators to configure the settings for the IT devices.

However, devices in the IT environment of a typical organization are made by different manufacturers, and different device management tools for managing such devices of respective different manufacturers.

There exists a need for an improved device management tool that permits an administrator to manage devices made by various different manufacturers.

SUMMARY

Various device management tools (for example, a system, an apparatus, application software, etc.) can be provided to help an information technology (IT) administrator with management of IT assets in a typical networked IT system that includes a heterogeneous group of devices.

In an aspect of this disclosure, a monitoring engine unit or part determines device make and other device characteristics of a selected device based on object identifier information collected from the selected device. If the monitoring engine unit determines that the selected device is in a particular subset of the plurality of devices that has a particular set of device settings items, the monitoring engine unit collects settings information from the selected device for the particular set of device settings items, and a user interface unit or part causes a first user interface to be provided to a device setting terminal to display the collected settings information for the particular set of device settings items corresponding to the particular subset of devices. On the other hand, if the monitoring engine unit determines that the selected device is in another subset of the plurality of devices that has another set of device settings items, the monitoring engine unit collects settings information from the selected device for said another set of device settings items, and the user interface unit or part causes a second user interface to be provided to the device setting terminal to display the collected settings information for said another set of device settings items corresponding to said another subset of devices.

In another aspect, the first user interface displaying the collected settings information for the particular set of device settings items permits the user operating the first user interface to change any one or more settings amongst the particular set of device settings items for a device (or multiple devices) in the particular subset of devices, and the second user interface displaying the collected settings information for said another set of device settings items permits the user operating the second user interface to change any one or more settings amongst said another set of device settings items for a device (or multiple devices) in said another subset of devices.

In another aspect, the particular set of device settings items associated with the particular subset of the plurality of devices can be predetermined, and the monitoring engine unit requests information from the selected device regarding the settings on the selected device for the particular set of device settings items.

In another aspect, in the case that the selected device is in said another subset of the plurality of devices, the monitoring engine unit queries the selected device to determine said another set of device settings items, and requests information from the selected device regarding the settings on the selected device for said another set of device settings items, or the monitoring engine unit employs the object identifier information collected from the selected device, to query a management information base to determine said another set of device settings items.

In another aspect, the monitoring engine unit is configured by a first plugin to collect the settings information through a network from the selected device indicating the settings on the selected device for the particular set of device settings items, and to trigger the user interface unit to cause the first user interface to be provided to display the settings information collected, from the selected device, for the particular set of device settings items, in the case that the selected device is in the particular subset of the plurality of devices. On the other hand, the monitoring engine unit is configured by a second plugin to collect the settings information for said another set of device settings items, from the selected device through the network, and to trigger the user interface unit to cause the second user interface to be provided to display the collected settings information for said another set of device settings items, in the case that the selected device is in said another subset of the plurality of devices.

In another aspect, the monitoring engine unit communicates a software agent to a computer connected to the selected device, and cause the software agent to be installed on the computer, transparent to the user of the computer. The software agent collects the object identifier information from the selected device, and collects the device settings information from the selected device and relays the device settings information collected from the selected device to the monitoring engine unit.

In another aspect, when a newer version of the software agent is available, the monitoring engine unit communicates the newer version to the computer connected to the selected device, and causes the software agent on the computer to be replaced by the newer version, transparent to the user of the computer.

BRIEF DESCRIPTION OF THE DRAWINGS

The aforementioned and other aspects, features and advantages can be more readily understood from the following detailed description with reference to the accompanying drawings wherein:

FIG. 5A shows a sample settings information, according to an exemplary embodiment;

FIG. 5B shows a sample information collected from an IT device, according to an exemplary embodiment;

FIGS. 9A-9D show sample screenshots of a user interface displayed to the user, according to an exemplary embodiment;

FIG. 10A shows a sample table associating each device make with a corresponding plugin, according to an exemplary embodiment;

FIG. 10B shows a sample table of predetermined device settings items, according to an exemplary embodiment;

DETAILED DESCRIPTION

Figure 1:
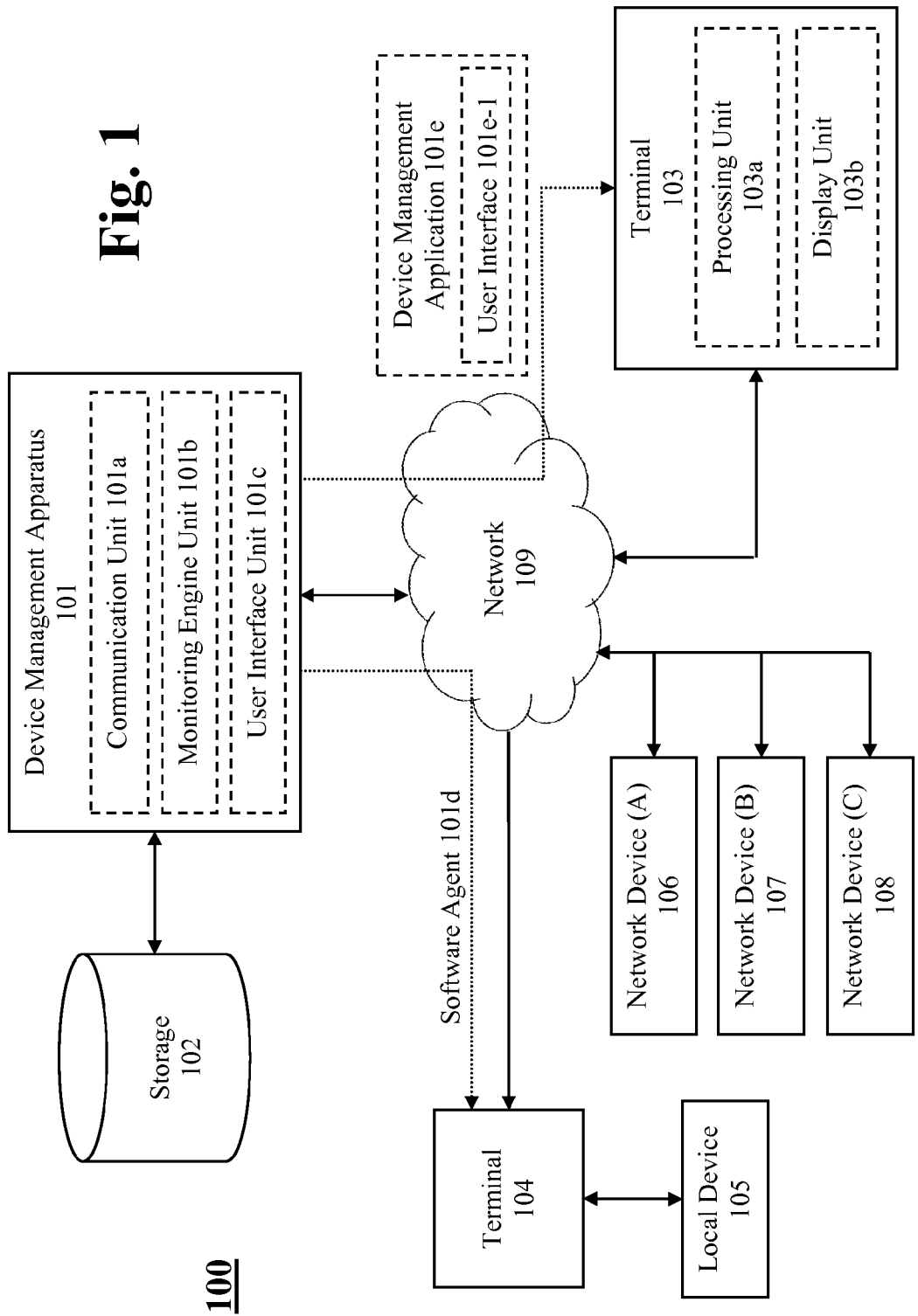
FIG. 1 shows a block diagram of a system for managing a plurality of network-connected devices, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there is described tools (systems, apparatuses, methodologies, computer program products, etc.) for managing information technology devices, such as computers, printers, scanners, multi-function devices, and other network-connected, or standalone, devices (such as a projector unit, a video conference device, a telephone conference device, a shredding device, a stamp device, etc.), and for managing one or more networks to which a plurality of such information technology devices are connected.

For example, FIG. 1 shows schematically a system 100 for managing a plurality of information technology (IT) devices, according to an exemplary embodiment. The system 100 includes a device management apparatus 101, a storage 102, terminals 103 and 104, a local device 105 and network devices 106-108, all of which are interconnected by a network 109.

In the example of FIG. 1, the device management apparatus 101 is configured to monitor device status of a plurality of devices (e.g. local device 105 and network devices 106-108) in the IT environment, and to collect device settings information from the plurality of devices. The device management apparatus 101 includes a communication unit 101a, a monitoring engine unit 101b, and a user interface unit 101c.

The communication unit 101a communicates through the network 109 with any selected device amongst the terminals 103 and 104 and the network devices 106-108. The communication unit 101a is configured to communicate with any particular device amongst plural heterogeneous devices that may be included in the system 100 in a communication format native to the particular device. For example, in the system 100, the communication unit 101a communicates with each of the network devices 106-108 in a communication format established by the respective manufacturers/vendors of the network devices 106-108. The communication unit 101a may determine an appropriate communication format native to the particular device by any of various known approaches. For example, the monitoring engine unit 101b, which controls the communication unit 101a to communicate with the various devices in the system 100, may refer to a database or table, maintained internally or by an outside source, to determine an appropriate communication format native to the device. As another example, the monitoring engine unit 101b may access an Application Program Interface (API) of the particular device, in order to determine an appropriate communication format native to the device. The communication unit 101a includes any communication part discussed in the present disclosure.

The monitoring engine unit 101b causes the communication unit 101a to communicate through the network 109 with the terminals 103 and 104 and the network devices 106-108, and similarly, the monitoring engine unit 101b includes any monitoring engine part discussed in the present disclosure.

The monitoring engine unit 101b determines device make and other device characteristics of a selected device based on object identifier information collected from the selected device. For example, the monitoring engine unit 101b may retrieve the object identifier information (e.g. object identifier, which uniquely identifies a managed object in a management information base hierarchy) from the selected device using an SNMP (Simple Network Management Protocol) command, and utilize the retrieved object identifier to determine the device make (and other device characteristics) of the selected device. Alternatively, the object identifiers may be provided by hardware manufacturers or may be found in OID (object identifier) repositories, where collections of MIB (management information base) trees and the respective OIDs can be accessed. The management information base described in the present disclosure may be a standard MIB, a private MIB (e.g. for a specific manufacturer/enterprise) or any other device database maintained by the devices or by a separate server accessible via the network.

In addition, the object identifier information may be a device ID assigned to the device either after installation in the network or during the manufacturing stage. For example, the table shown in FIG. 5B includes device IDs of the devices in the network system along with numerous other parameters such as device name, device manufacturer and IP address. Such table may be utilized to determine the device make (or any other device characteristics) of the device selected by the user.

Based on one or more of the device make and other device characteristics of the selected device, the monitoring engine unit 101b determines (i) whether the selected device is in a particular subset of the plurality of devices that has a particular set of device settings items or (ii) whether the selected device is in another subset of the plurality of devices that has another set of device settings items that are different from said particular set of device settings items.

For example, some of the IT devices in the system 100 may have been manufactured by a particular manufacturer (or sold by a particular vendor) and, as a result, possess a specific set of device settings that may differ from some other IT devices manufactured by another manufacturer (or sold by another vendor). Some of such devices may have more device settings available to be configured by the device user, as compared to other devices which may be more limited in the kind of device settings that they allow the user to retrieve and/or configure.

In addition, the monitoring engine unit 101b may have more information about a particular subset of devices manufactured by one manufacturer (or sold by one particular vendor) than others, and the list of configurable settings that can be obtained from such particular subset of devices may be more complete, as compared to the settings information obtainable from other devices. Thus, such subset of the plurality of devices may be identified and dealt with separately from the other devices that may allow less device settings information to be retrieved and/or configured by the user or may require additional steps (e.g. use of a special plugin) to obtain comparable settings information therefrom.

For example, the monitoring engine unit may have access to all the device settings items retrievable from the devices manufactured by Company A. In such a case, if the monitoring engine unit determines that a particular device is manufactured by Company A, the monitoring engine unit can simply request the known device settings items from the selected device. In a case that the selected device is manufactured by some other company, Company B, for which less information is available to the monitoring engine unit, the monitoring engine unit may determine a plugin associated with the selected device (or associated with Company B), and utilize such plugin to discover device settings items available on the selected device and collect device settings information from the selected device.

The monitoring engine unit may refer to a table associating the device make of a selected device with a corresponding plugin, such as shown in the example of FIG. 10A. For example, if the device make of the selected device is Company A, Plugin A is used; if the device make of the selected device is Company B or Company C, Plugin B is used; if the device make of the selected device is any of Companies D-H, Plugin C is used; and otherwise, Plugin D is used to collect the device settings items from the selected device. As shown in FIG. 10A, devices manufactured by different manufacturers may have the same or similar settings, thus necessitating the use of the same plugin (e.g. device characteristics other than the device make may be checked to determine whether such devices share the same or similar type of settings items).

Figure 8:
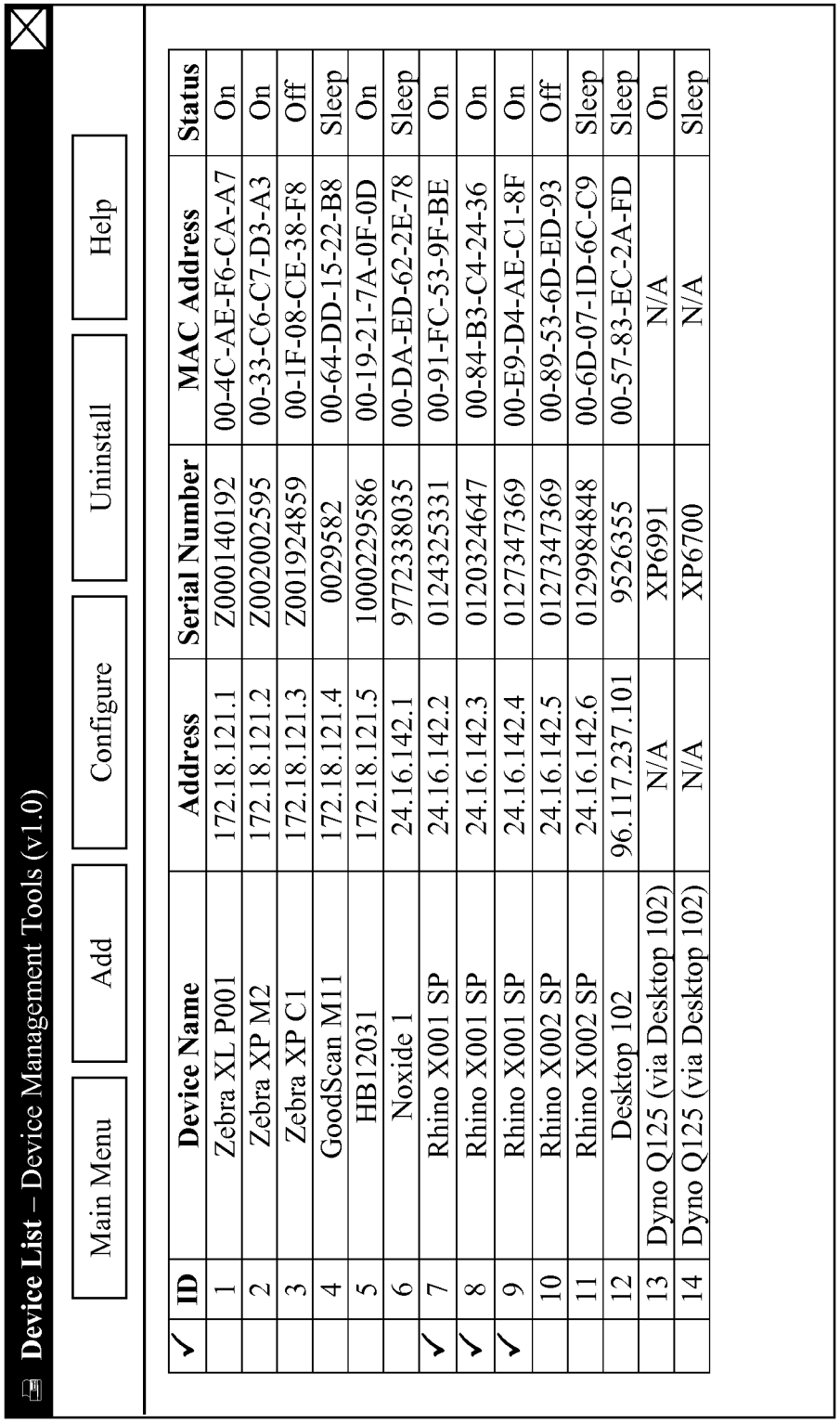
FIG. 8 shows a sample screenshot of a user interface displayed to the user, according to an exemplary embodiment.

The information used to determine the appropriate plugin for a selected device is not limited to the device make of the selected device, and may include other device characteristics such as device name, serial number, IP address, MAC address, availability of particular settings, etc. (e.g. such as shown in FIGS. 5B and 8).

Figure 14:
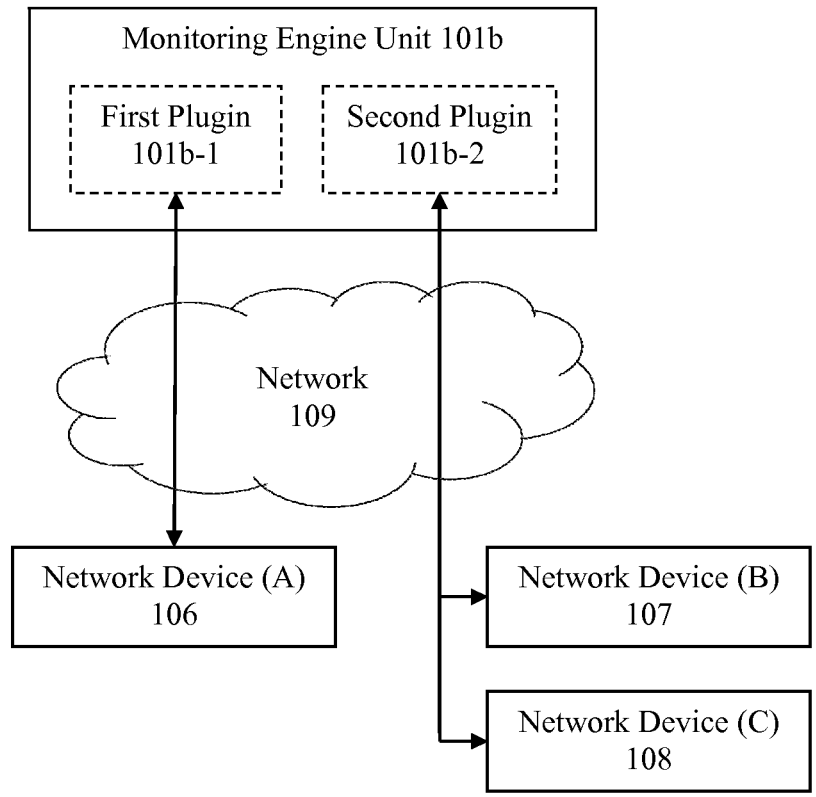
FIG. 14 shows a block diagram illustrating the communication between plugins and network devices, according to an exemplary embodiment.

By utilizing such a plugin, the monitoring engine unit can be configured (e.g. as shown in FIG. 14) to collect device settings information from a particular set of devices associated with the plugin. In the example of FIG. 14, the first plugin 101b-1 is configured to communicate with the network device 106 and the second plugin 101b-2 is configured to communicate with the network devices 107 and 108. Such plugins allow the monitoring engine unit 101b to retrieve more settings items, as compared to retrieving settings items from a standard MIB. Although the first and second plugins 101b-1 and 101b-2 are shown in FIG. 14, the monitoring engine unit may be configured by any arbitrary number of such plugins, and additional plugins may be installed as needed. Such plugins may be developed under an agreement between the developers of such plugins and the device manufacturers for whose devices the plugins were developed. Additionally, such plugins may be updated as needed (e.g. by downloading a new version of the plugin from an update server and installing the new version of the plugin on the device management apparatus).

Thus, if the monitoring engine unit 101b determines, based on the device make and/or other device characteristics, that the selected device is in the particular subset of the plurality of devices (e.g. manufactured by Company A), the monitoring engine unit 101b collects settings information for the particular set of device settings items from the selected device. Using the collected settings information, the user interface unit 101c causes the user interface 101e-1 (e.g. first user interface) to be provided to the terminal 103. In such case, the user interface 101e-1 displays the settings information, collected from the selected device, for the particular set of device settings items corresponding to the particular subset (e.g. manufactured by Company A) of the plurality of devices.

On the other hand, if the monitoring engine unit 101b determines, based on the device make and/or other device characteristics, that the selected device is in another subset of the plurality of devices (e.g. manufactured by Company B), the monitoring engine unit 101b collects settings information for said another set of device settings items from the selected device. Using the collected settings information, the user interface unit 101c causes the user interface 101e-1 (e.g. second user interface) to be provided to the terminal 103. In such case, the user interface 101e-1 displays the settings information, collected from the selected device, for said another set of device settings items corresponding to said another subset (e.g. manufactured by Company B) of the plurality of devices.

Many printers and other devices store data indicating their attributes or properties in the MIB. The MIB may conform with the SNMP protocol, and device settings information can be obtained directly from the MIB through SNMP queries. The device settings information can also be obtained using other known protocols. In this way, the monitoring engine unit 101b may collect the device settings information from, for example, the network devices 106-108. Such device settings information obtained from a standard MIB may differ from that which can be obtained from a private MIB of a particular subset of the plurality of devices manufactured by a particular manufacturer (or sold by a particular vendor).

An example of device settings information collected by the monitoring engine unit 101*b* is illustrated in FIG. 5A. As seen in FIG. 5A, the device settings information for each IT device may include a variety of attributes such as setting name, setting type, default value of the setting, and the options selectable for the setting. The information depicted in FIG. 5A is merely exemplary, and a wide range of other device preference settings, such as network settings, authentication settings, log settings, image settings, print settings and etc., may be included in the device settings information collected by the monitoring engine unit. As non-limiting examples, "device group" indicating the group to which the particular network-connected device belongs in a network environment, "SNMPv3" indicating whether SNMPv3 (Simple Network Management Protocol, version 3) is enabled, "reception protocol" indicating a protocol used for e-mail reception, "memory overflow" indicating an action to perform in the event of a memory overflow (e.g. do not print), "toner saving" indicating whether a toner saving mode is enabled, "firmware update" indicating whether firmware update is permitted, and so forth.

The device settings information collected by the monitoring engine unit 101*b* can be stored in an internal storage resident in the device management apparatus 101. Alternatively, the device settings information can be stored externally in a storage unit connected to the device management apparatus 101 (e.g. storage 102) or accessible via the network 109, and retrieved as needed.

Further, as illustrated in FIG. 1, the monitoring engine unit 101*b* causes a software agent 101*d* to be installed on the terminal 104, which is connected to the local device 105. The software agent 101*d* is, for example, a software component which is configured to carry out specific tasks, such as communicating with USB-connected devices (or devices connected via serial ports, parallel ports, etc.), collecting device settings information from the USB-connected devices, and communicating the collected device settings information back to the monitoring engine unit 101*b*. For example, the software agent 101*d* installed on the terminal 104 may collect device settings information from the local device 105 in the manner similar to that utilized by the monitoring engine unit 101*b* (albeit via a direct connection rather than a network connection) to collect device settings information from the network devices 106-108.

The user interface unit 101*c* causes a user interface 101*e* to be displayed on the terminal 103. For example, as shown in FIG. 1, the user interface unit 101*c* causes a device management application 101*e* to be transmitted to the terminal 103, which includes a processing unit 103*a* and a display unit 103*b*. When the user interface unit 101*c* causes the device management application 101*e* to be executed by the processing unit 103*a*, the user interface 101*e*-1 is displayed on the display unit 103*b* of the terminal 103. The user interface unit 101*c* includes any user interface part discussed in the present disclosure.

The user interface 101*e*-1 displayed to the user at the terminal 103 reflects the device settings information retrieved from the local device 105 and the network devices 106-108, and displays device settings for one or more devices selected by the user. The user interface 101*e*-1 permits the user to change any one or more of such settings displayed in the user interface 101*e*-1. The user interface 101*e*-1 is further described infra with reference to FIGS. 7-9.

When the user specifies the device settings for a selected device (e.g. local device 105 and/or network devices 106-108), the monitoring engine unit 101*b* receives the user-specified device settings and causes the user-specified device settings to be written on the selected device. For example, the monitoring engine unit 101*b* may receive the device settings specified by the user, which includes a list of parameters configurable on the selected device and a corresponding value for each parameter, and set the value of each of such parameters on the selected device to the corresponding value included in the user-specified device settings. The selected device may maintain a database which stores such parameters and corresponding values. A separate user profile including all of the device settings of the selected device (e.g. the network devices 106-108) may be maintained for each of a plurality of users of the network devices 106-108.

The storage 102 may store the device settings information collected from the local device 105 and/or the network devices 106-108. The storage 102 may also store other files and data necessary for the operation of the device management apparatus 101, such as the software agent 101*d*, the device management application 101*e*, and various other data (e.g. plugins, device make information, user management tables, etc.). Although the storage 102 is illustrated as being directly connected to the device management apparatus 101, the storage 102 may be internal to the device management apparatus 101 or accessible by the device management apparatus 101 (and potentially by other devices in the system 100) via the network 109.

The device management apparatus 101 and/or the terminal 103 may utilize one or more databases to store the device settings information or any other information generated or collected in the network system. Such database(s) may include off-the-shelf database applications based on SQL (Structured Query Language), or other customized database applications with search/query function. If the information is stored in more than one location, the information may be synced, for example, periodically or upon a user request.

The terminal 103 includes a processing unit 103*a* and a display unit 103*b*. For example, the user interface unit 101*c* causes the processing unit 103*a* to execute the device management application 101*e*, causing the display unit 103*b* to display the user interface 101*e*-1. The user at the terminal 103 (e.g. a user of the IT environment managed by the device management apparatus 101) can configure the device settings displayed via the user interface 101*e*-1. The terminal 103 is further described infra with reference to FIG. 6B.

The terminal 104 has a similar configuration as the terminal 103, and is connected to the local device 105 via, for example, a USB port, a serial port, a parallel port, etc., or otherwise directly connected to the local device 105.

The local device 105 and the network devices 106-108 may include, for example, a printer, a scanner and/or a multi-function device (MFD). While this example of this disclosure simply refers to the local device 105 and the network-connected devices 106-108 in the interest of brevity, the aspects of this disclosure are applicable to a network environment having an arbitrary number of local (e.g. directly connected to a terminal) or network devices.

Similarly, the system 100 has the terminals 103 and 104 in the example of FIG. 1, the system 100 can include more terminals and other IT devices. Indeed, the network management system of this disclosure is preferably configured to be scalable such that terminals and IT devices can be added to the system as desired and needed (e.g. to serve more users).

The network 109 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 109. In addition, the network 109 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

The settings information collected from the local device 105 and the network devices 106-108 may also include other items such as those shown in FIG. 5B. As shown in FIG. 5B, such items for each IT device may include a variety of attributes such as name, manufacturer, IP address, device age, status, firmware version and department. The information depicted in FIG. 5B is merely exemplary, and other network devices, device status information, device properties, device configuration information, and so forth, may be included in the information collected by the monitoring engine units. As non-limiting examples, the collected information may include one or more of the following for a given network device: device manufacturer; device model; device serial number; device type (printer, scanner, terminal, etc.); device location (physical address, geographic address, network address, IP address, MAC address, etc.); output technology (e.g., laser, inkjet solid ink, thermal, other technology, etc.); device location type (e.g., production/copy center, in a specific workgroup area, etc.); scope (e.g., within the scope of administrative responsibility of a particular IT administrator, outside the scope of administrative responsibility of particular IT administrator, etc.); connection type (e.g., network connected, workstation/local connected, non-connected, etc.); device age (e.g., <1 year, 1-2 years, 2-3 years, 3-4 years, 4-5 years, >5 years, etc.); functions (e.g., copy, fax, print, scan, copy/scan, copy/fax, copy/print, print/fax, print/scan, copy/print/fax, copy/print/scan, copy/print/fax/scan, etc.); firmware version (e.g., major version, minor version, etc.); installed applications (e.g., application name, major version, etc.); organization (e.g., different groups, sub-groups, levels, departments, divisions and so forth within a larger enterprise or institutional entity, such as management group, sales group, marketing group, research & development group, etc.); supply level (e.g., consumable types such as paper and toner >empty/low/ok, etc.); capability (e.g., color, economy color, monochrome only, color scan, duplex, A3, not A3, etc.); last status update (e.g., 10 minutes, 60 minutes, 6 hours, etc.); duplex usage (e.g., 2:1, 1:2, 2:2, Book Duplex, etc.); paper size usage (e.g., A3, A4, B4, etc.); pages per job (e.g., 1, 2, 6-10, etc.); pages per minute (PPM) range (e.g., 1-20 ppm, 41+ ppm, etc.); color technology (e.g., professional color, convenience color, etc.); audit results/analysis (e.g., devices which satisfied a particular audit or test, devices which did not satisfy a particular audit or test, etc.); and so forth.

Such information collected from the local device 105 and the network devices 106-108 may also include error history information that includes a log of all errors occurring at the corresponding managed device, and usage history information indicating which users have the utilized the managed device and when such use has occurred. The usage history information may indicate, for example, a number of total impressions (e.g. pages) produced by a user, or a number of specific types of impressions (copy color, copy BW, print color, print BW, etc.) produced by a user.

The monitoring engine unit 101b communicates with one or more of the plurality of IT devices to collect and obtain the various data corresponding to each device. As discussed above, many printers and other devices store data indicating their attributes or properties in a Management Information Base (MIB). The MIB may conform with the SNMP (Simple Network Management Protocol) protocol, and properties information can be obtained directly from the MIB through SNMP queries. In this way, the monitoring engine unit 101b may be configured to discover and/or poll the corresponding plurality of network devices to obtain the data from the network devices.

The monitoring engine unit 101b may obtain information (such as the name, status, configuration information, error history, usage history, etc.) from each network device by monitoring a network to which the device is connected (i.e. network 109), and detecting and receiving one or more alert notifications or status updates transmitted to the network from any of the plurality of IT devices. For example, the monitoring engine unit 101b may receive the status updates by repeatedly transmitting requests to the network devices 106-108 via the network 109, inquiring as to the status of each network device. In response, each network device may transmit status updates back to the monitoring engine unit 101b, wherein each status update indicates the device name, status, configuration information, error history, usage history, whether an error exists or has occurred at the network device, etc. Alternatively, each of the network devices 106-108 may automatically transmit status updates to the monitoring engine unit 101b (without waiting for requests or queries from the monitoring engine unit 101b), at regular intervals or whenever an error occurs at the network-connected device. The device management apparatus 101 may include locally resident hardware and/or software agents installed locally on each of the network devices 106-108, which are configured to transmit the status updates directly to the monitoring engine unit 101b. The collected information may be stored along with other data in the device storage 102, or alternatively, in a storage part resident in the device management apparatus 101 or accessible via the network 109 and retrieved as needed.

Figure 2:
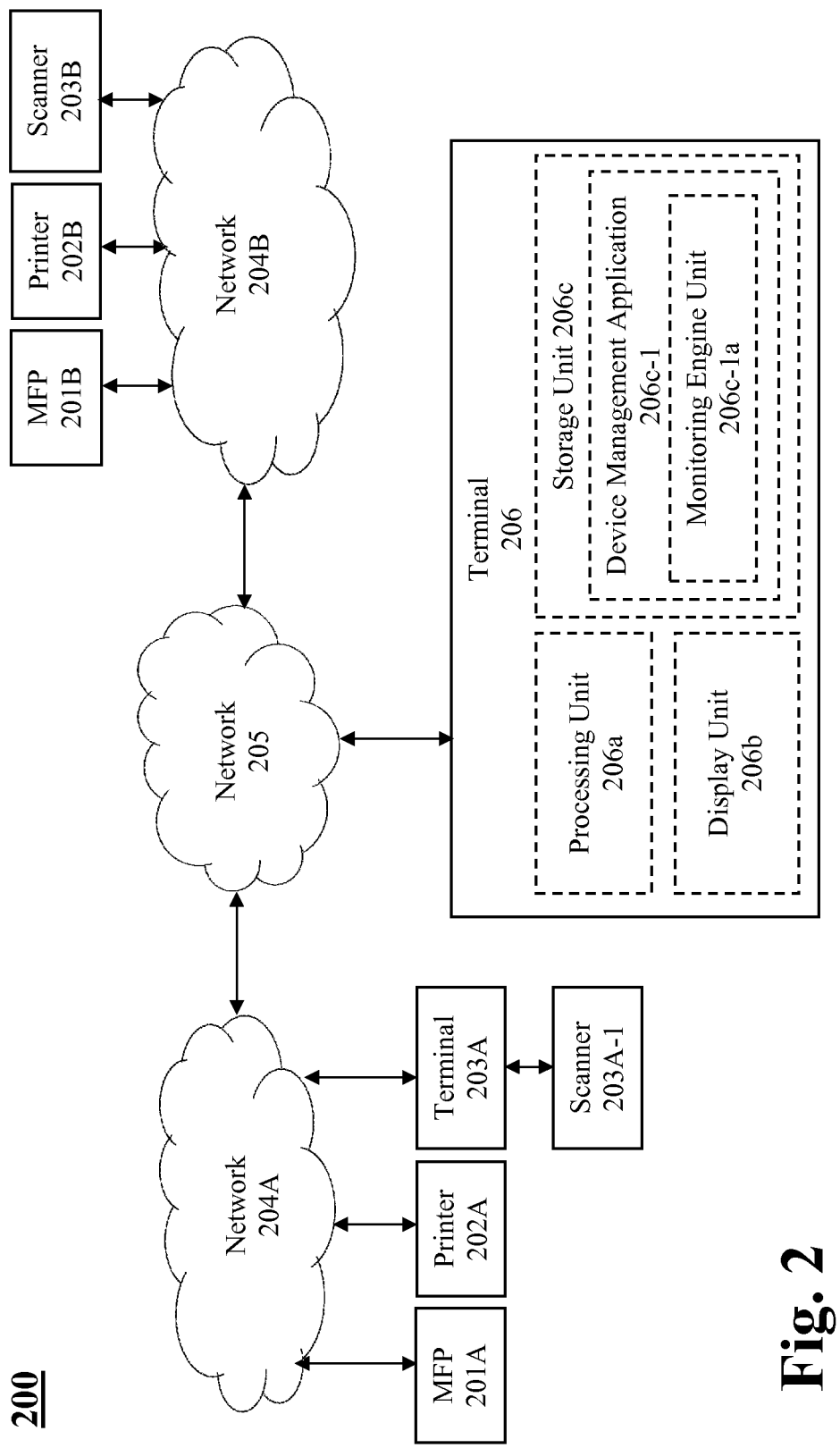
FIG. 2 shows a block diagram of a system for managing a plurality of network-connected devices, according to another exemplary embodiment.

With reference to FIG. 2, a system for managing a plurality of IT devices, according to another exemplary embodiment, is described below.

The example of FIG. 2 includes a system 200 which includes a multi-function peripheral (MFP) 201A, a printer 202A and a terminal 203A connected to a scanner 203A-1, all of which are interconnected by a network 204A (collectively "Network A"); an MFP 201B, a printer 202B and a scanner 203B, all of which are interconnected by a network 204B (collectively "Network B"); and a terminal 206, which is connected to a network 205 which is connected to the networks 204A and 204B.

The terminal 206 includes a processing unit 206a, a display unit 206b and a storage unit 206c. The operations of the processing unit 206a and the display unit 206b are similar to those of the processing unit 103a and the display unit 103b discussed in connection with FIG. 1, respectively. The storage unit 206c includes a device management application 206c-1 having a monitoring engine unit 206c-1a. Upon the execution of the device management application 206c-1 by the processing unit 206a, a user interface similar to that described with reference to FIG. 1 is displayed on the display unit 206b.

For example, when the device management application 206c-1 receives a user request (e.g. from a user at the terminal 206) to configure the device settings of one or more of the IT devices in Networks A and B selected by the user at the terminal 206, the monitoring engine unit 206c-1a of the device management application 206c-1 communicates with the selected device(s) [e.g. MFPs 201A and 201B, printers 202A and 202B, and scanners 203A-1 (via the terminal 203A) and 203B] in Networks A and B to collect device settings information from the IT devices and causes a user interface including the device settings for the selected device(s) to be displayed on the display unit 206b of the terminal 206. Alternatively, the monitoring engine unit 206c-1a may utilize previously stored device settings information of the selected device(s) to cause the user interface to be displayed to the user at the terminal 206.

Thus, a user can remotely configure device settings of a plurality of IT devices over multiple networks. It should be appreciated that although only two networks (Networks A and B) are shown in the example of FIG. 2, the system 200 is not limited to such configuration and the terminal 206 can be configured such that a user at the terminal 206 may configure device preference settings of a plurality of network devices in any arbitrary number of networks.

Otherwise, operations of the elements of the system 200 are similar to those discussed in connection with the corresponding elements of the system 100 of FIG. 1.

Figure 3:
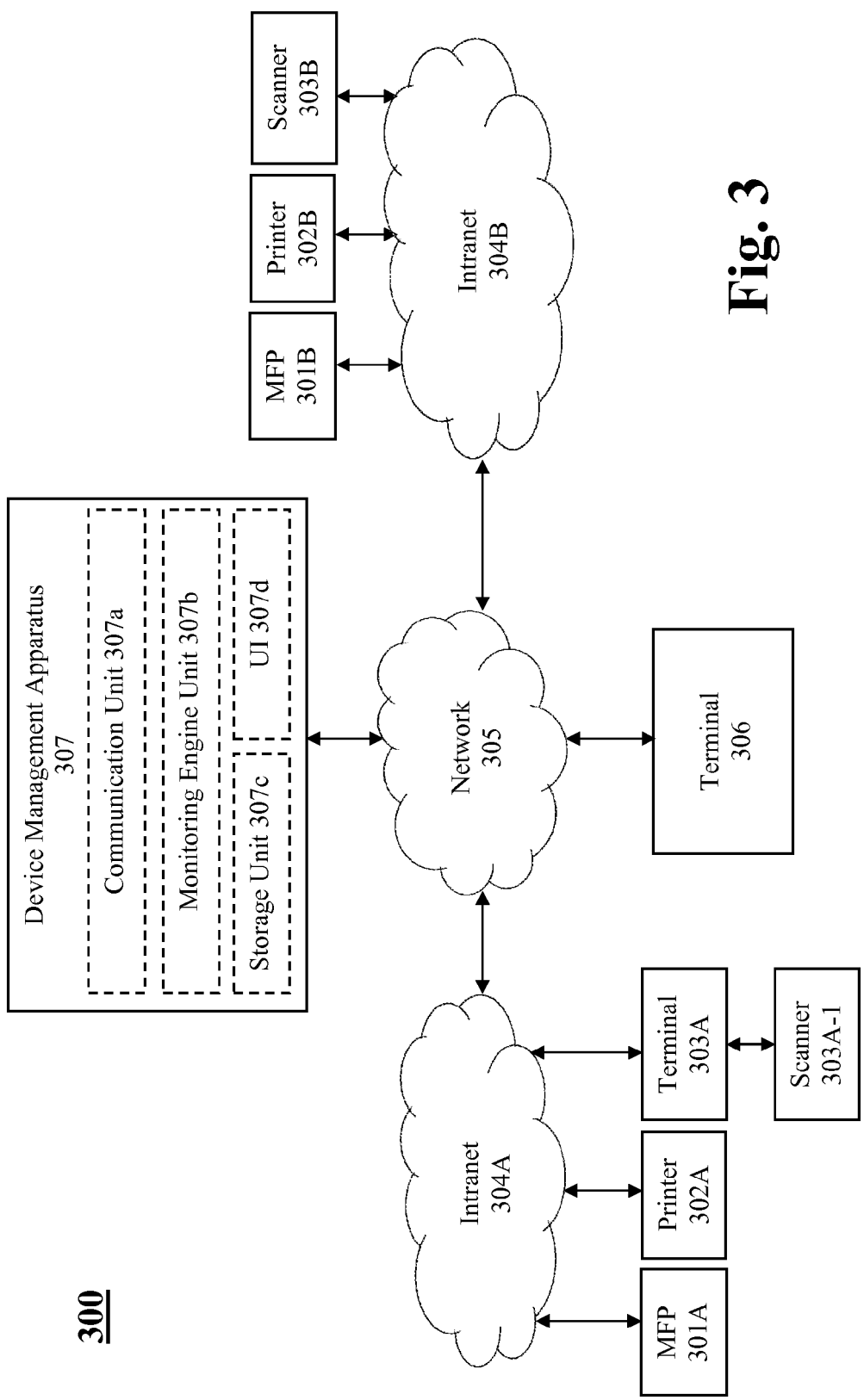
FIG. 3 shows a block diagram of a system for managing a plurality of network-connected devices, according to another exemplary embodiment.

With reference to FIG. 3, a system for managing a plurality of IT devices, according to another exemplary embodiment, is described below.

The example of FIG. 3 includes a system 300 which includes an MFP 301A, a printer 302A and a terminal 303A connected to a scanner 303A-1, all of which are interconnected by an intranet 304A (collectively "Network A"); an MFP 301B, a printer 302B and a scanner 303B, all of which are interconnected by an intranet 304B (collectively "Network B"); and a terminal 306 and a device management apparatus 307, which are interconnected by a network 305. The network 305 is connected to the intranets 304A and 304B. The device management apparatus 307 includes a communication unit 307a, a monitoring engine unit 307b, a storage unit 307c and a user interface 307d.

For example, each of the Networks A and B respectively connected by the intranets 304A and 304B may represent a regional office of a global/national enterprise having multiple regional offices.

In the example of FIG. 3, the user interface 307d via which the user may configure device settings of the various network devices in the IT environment is provided on the device management apparatus 307. The monitoring engine unit 307b communicates with the IT devices of Networks A and B [e.g. MFPs 301A and 301B, printers 302A and 302B, and scanners 303A-1 (via the terminal 303A) and 303B] to collect device settings information from one or more of the IT devices selected by the user, and causes device settings for the selected IT devices to be reflected in the user interface 307d displayed to the user for user configuration of the device settings.

As discussed above, the storage unit 307c may store one or more copies of the software agent to be installed on, for example, the terminal 303A for communicating with the scanner 303A-1 and/or device settings information collected by the monitoring engine unit 307b from the IT devices in the system 300.

Otherwise, operations of the elements of the system 300 are similar to those discussed in connection with the corresponding elements of the system 100 of FIG. 1.

Figure 4:
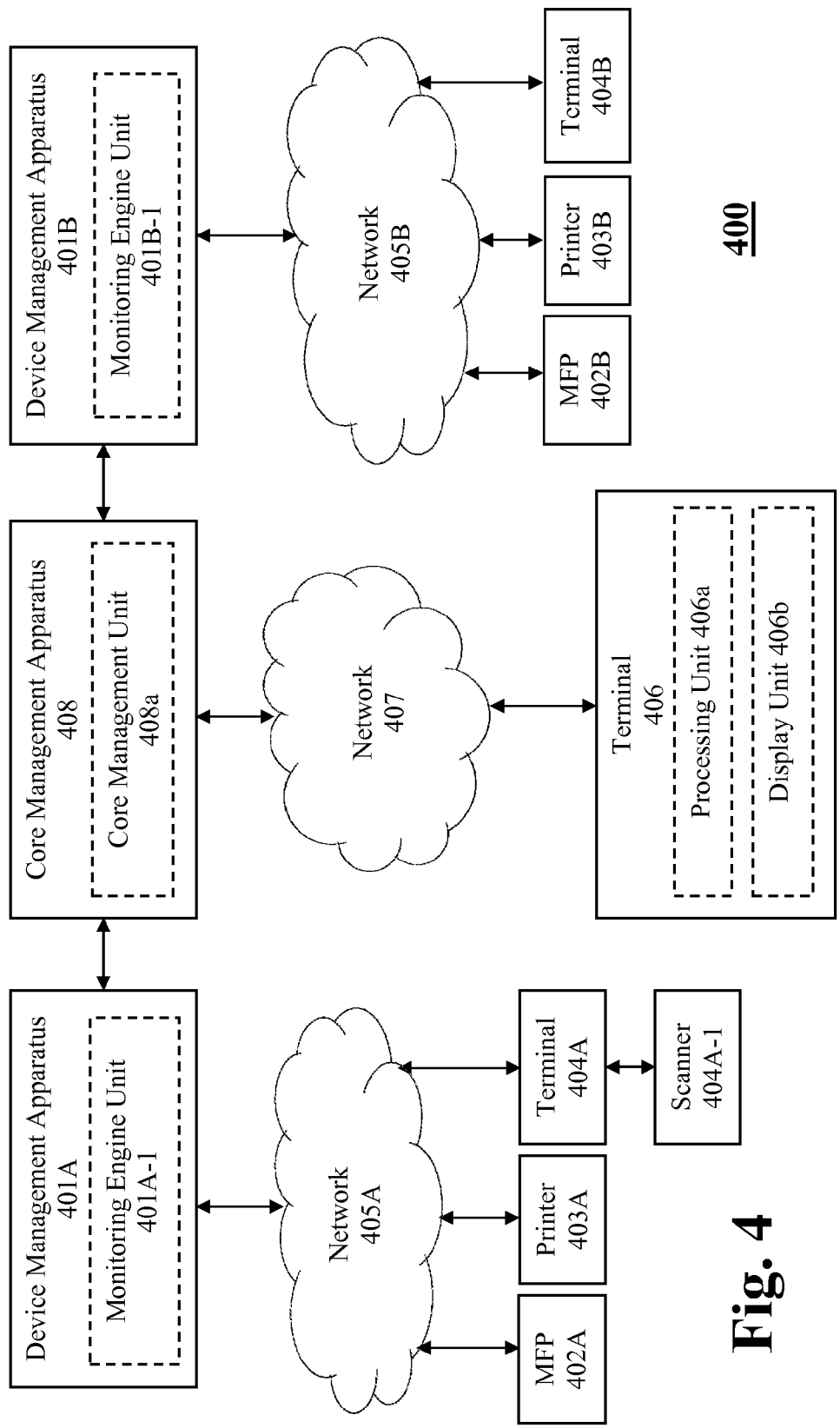
FIG. 4 shows a block diagram of a system for managing a plurality of network-connected devices, according to another exemplary embodiment.

With reference to FIG. 4, a system for managing a plurality of IT devices, according to another exemplary embodiment, is described below.

The example of FIG. 4 includes a system 400 which includes a device management apparatus 401A including a monitoring engine unit 401A-1, an MFP 402A, a printer 403A and a terminal 404A connected to a scanner 404A-1, all of which are interconnected by a network 405A (collectively "Network A"); a device management apparatus 401B including a monitoring engine unit 401B-1, an MFP 402B, a printer 403B and a terminal 404B, all of which are interconnected by a network 405B (collectively "Network B"); a terminal 406 and a core management apparatus 408 including a core management unit 408a, which are interconnected by a network 407 (collectively "Network C"). The core management apparatus 408 is connected to the device management apparatuses 401A and 401B.

Each of terminals 404A and 404B may be a user terminal via which a user interface for configuring device settings of the IT devices of the respective networks is displayed. For example, when the user at the terminal 404A specifies device settings for the printer 403A, the monitoring engine unit 401A-1 transmits the user-specified device settings to the printer 403A and causes the user-specified device settings to be written on the printer 403A. For example, the user-specified device settings may include a list of parameters configurable on the printer 403A and a corresponding value for each parameter. In such case, the monitoring engine unit 401A-1 may cause the value of each of such parameters on the printer 403A to be set to the corresponding value included in the user-specified device settings. The printer 403A may maintain a database which stores such parameters and corresponding values. A separate user profile including all of the device settings specified by each user of the system 400 may be maintained for each of a plurality of users (e.g. on the printer 403A or the device management apparatus 401A).

In addition, the user at the terminal 406 may also configure the IT devices in Networks A and B via the core management apparatus 408. When the user at the terminal 406 specifies device settings for the printer 403A (via a user interface indicating the configurable device settings of a selected device displayed by the display unit 406b), the core management unit 408a communicates the user-specified device settings to the monitoring engine unit 401A-1, which in turn causes, as discussed above, the user-specified device settings to be written on the printer 403A.

For example, the user at the terminal 404A may be a user at the local office of an enterprise, each of Networks A and B representing a separate office, and the user at the terminal 406 may be an administrator who is responsible for managing the entire enterprise network and authorized to remotely configure device settings on the IT devices in multiple regional networks.

The core management unit 408a and/or the monitoring engine units 401A-1 and 401B-1 may be realized by a computer program product including a computer-usable, non-transient medium (such as a disk storage apparatus) having instructions tangibly embodied therein that are executed by a computer. Thus, it should be understood that the core management unit 408a and/or the monitoring engine units 401A-1 and 401B-1 may be executed on a computer. While the core management unit 408a and/or the monitoring engine units 401A-1 and 401B-1 are shown as being external to the network devices, the core management unit 408a and/or the monitoring engine units 401A-1 and 401B-1 may in fact be executed on a client terminal and/or network-connected device.

The core management apparatus 408 and/or the device management apparatuses 401 may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

As an example, the core management apparatus 408 may be used by a super administrator who is in charge of managing an entire enterprise network which may include plural regional networks. In contrast, each local administrator may be in charge of managing one of such plural regional networks via the device management apparatuses 401.

In the example of FIG. 4, only three networks (Networks A-C) are shown in the interest of brevity, but the system 400 is not limited to such configuration. The core management apparatus 408 may be connected to any arbitrary number of device management apparatuses 401 and other devices (e.g. terminal 406).

Otherwise, operations of the elements of the system 400 are similar to those discussed in connection with the corresponding elements of the system 100 of FIG. 1.

Figure 6A:
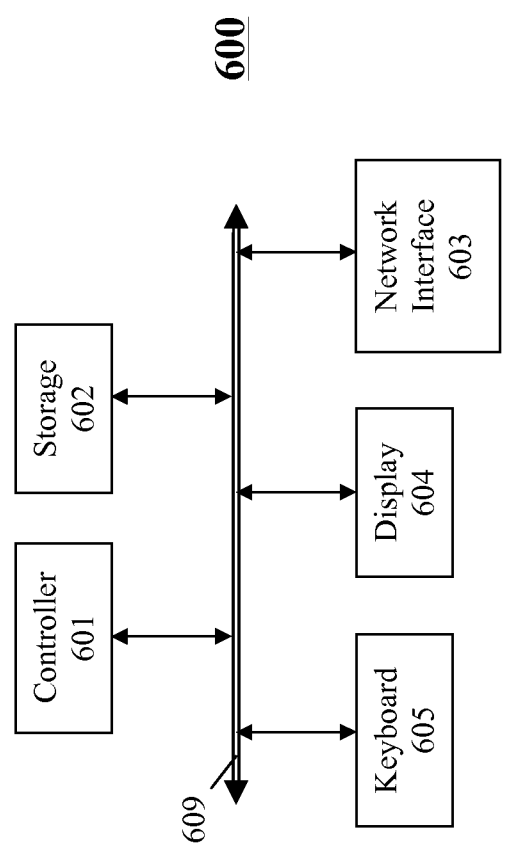
FIG. 6A shows a block diagram of an exemplary configuration of a device management apparatus, such as illustrated in FIG. 1.

FIG. 6A shows an exemplary configuration of a computing device that can be configured (for example, through software) to operate (at least in part) as the core management apparatus 408 of FIG. 4 and/or device management apparatuses 401 illustrated in FIG. 4. As shown in FIG. 6A, the management unit 600 includes a controller (or central processing unit) 601 that communicates with a number of other components, including memory or storage part 602, network interface 603, display 604 and keyboard 605, by way of a system bus 609.

The management unit 600 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In the management unit 600, the controller 601 executes program code instructions that control device operations. The controller 601, memory/storage 602, network interface 603, display 604 and keyboard 605 are conventional, and therefore in order to avoid occluding the inventive aspects of this disclosure, such conventional aspects will not be discussed in detail herein.

The management unit 600 includes the network interface 603 for communications through a network, such as communications through the network 109 with the network devices 106-108 in FIG. 1. However, it should be appreciated that the subject matter of this disclosure is not limited to such configuration. For example, the management unit 600 may communicate with client terminals through direct connections and/or through a network to which some components are not connected. As another example, the management unit 600 does not need to be provided by a server that services terminals, but rather may communicate with the devices on a peer basis, or in another fashion.

The core management unit and/or the monitoring engine units of the present disclosure are not limited to a server or computer, but can be manifested in any of various devices that can be configured to communicate over a network and/or the Internet.

Figure 6B:
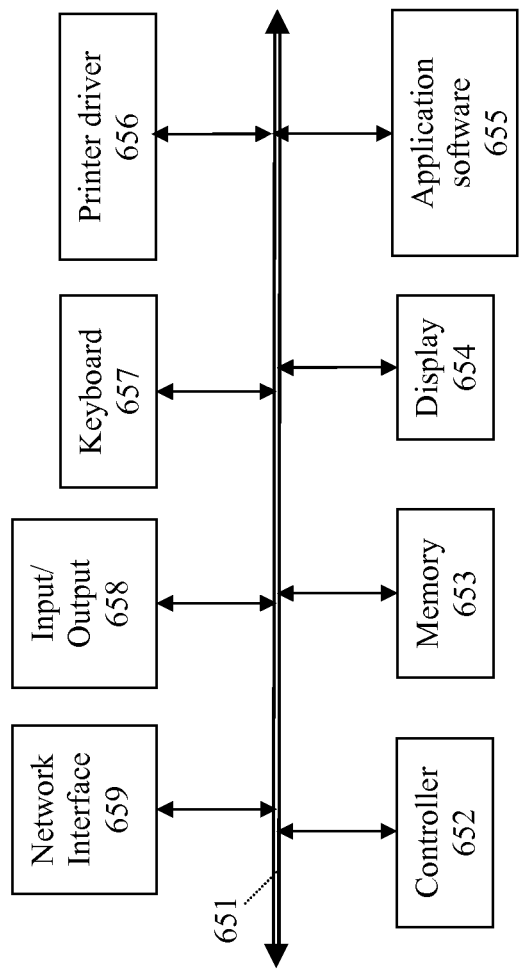
FIG. 6B shows a block diagram of an exemplary configuration of a terminal, such as illustrated in FIGS. 1-4.

An example of a configuration of the terminals 103 and 104 of FIG. 1 and/or other terminals described in the present disclosure (for example, as a computer) is shown schematically in FIG. 6B. In FIG. 6B, computer 650 includes a controller (or central processing unit) 652 that communicates with a number of other components, including memory 653, display 654, keyboard (and/or keypad) 657, other input/output (such as mouse, touchpad, stylus, microphone and/or speaker with voice/speech interface and/or recognition software, etc.) 658, network interface 659, print driver 656 and application software 655, by way of an internal bus 651.

The memory 653 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 659 provides a connection (for example, by way of an Ethernet connection or other network connection which supports any desired network protocol such as, but not limited to TCP/IP, IPX, IPX/SPX, or NetBEUI) to the network to which the computer 650 is connected (e.g. network 109 of FIG. 1).

Print driver 656 and application software 655 are shown as components connected to the internal bus 651, but in practice are typically stored in storage media such as a hard disk or portable media, and/or received through the network, and loaded into memory 653 as the need arises.

Depending on the type of the particular terminal device, one or more of the components shown in FIG. 6B may be missing. For example, a particular mobile phone may be missing the print driver 656 and the keyboard 657.

Additional aspects or components of the computer 650 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Each of the local device 105 and the network devices 106-108 of FIG. 1 (or other network-connected devices described in the present disclosure) may be any device including but not limited to a personal, notebook or workstation computer, a terminal, a kiosk, a personal digital assistant (PDA), a tablet computing device, a smartphone, a scanner, a printer, a facsimile machine, a multi-function device (MFD), a server, a mobile phone or handset, another information terminal, etc. Each network device may be configured with software allowing the network device to communicate through a network with a monitoring engine unit and/or a core management unit described in the present disclosure.

Figure 6C:
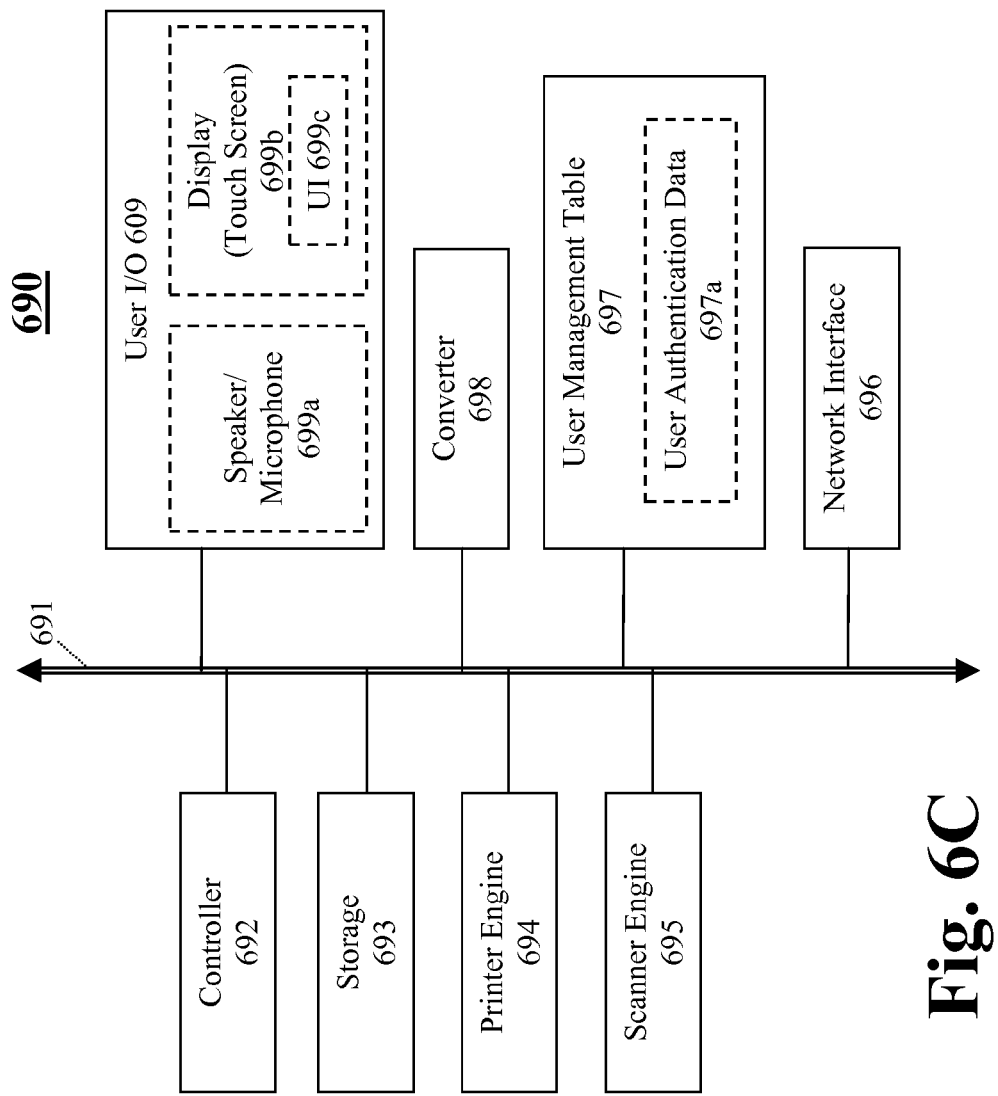
FIG. 6C shows a block diagram of an exemplary configuration of a multi-function device, such as illustrated in FIGS. 2-4.

FIG. 6C shows a schematic diagram of a configuration of a network-connected device as an MFD, according to an exemplary embodiment, which can be any apparatus (including a microprocessor chip or a collection of devices having varying degree of integration) that has the ability to perform two or more functionalities.

The MFD 690 shown in FIG. 6C includes a controller 692, and various elements connected to the controller 692 by an internal bus 691. The controller 692 controls and monitors operations of the MFD 690. The elements connected to the controller 692 include storage 693 (for example, random access memory, read-only memory, hard disk drive, portable storage media drive such as for optical discs, magnetic discs, magneto-optical discs, etc., semiconductor memory cards, combinations of storage media, etc.), printer engine 694, scanner engine 695, network interface (I/F) 696, converter 698 for converting data from one format to another format (for example, a format suitable for printing, faxing, e-mailing, etc.), and user I/O (Input/Output) 699. The controller 692 also utilizes information stored in user management table 697 to authenticate the user and control user access to the functionalities of the MFD 690.

Storage 693 can include one or more storage parts or devices [e.g. a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 693 and executed by the controller 692 to carry out the instructions. Such instructions can include instructions for performing specified functions (such as printing, scanning, faxing, copying, e-mailing, etc.) of the MFD 690, to enable the MFD 690 to interact with a terminal, as well as perhaps other external devices, through the network interface 696, and to control the converter 698, access data in the user management table 697, and interactions with users through the user I/O 699.

The network interface 696 is utilized by the MFD 690 to communicate with other network devices such as a terminal or a device management apparatus (e.g., device management apparatus 101 of FIG. 1) and receive data requests, print jobs, user interfaces, and etc.

The user I/O 699 includes one or more display screens that display, under control of controller 692, information allowing the user of the MFD 690 to interact with the MFD 690. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFD 690, so as to allow the operator to interact conveniently with services provided on the MFD 690, or with the MFD 690 serving as terminal for accessing electronic data or other content through the network. User interfaces or other contents received through the network via the network interface 696 can be displayed on the display screen.

The display screen does not need to be integral with, or embedded in, a housing of the MFD 690, but may simply be coupled to the MFD 690 by either a wire or a wireless connection. The user I/O 699 may include keys and/or buttons (such as graphical keys or buttons, or other graphical elements, of a GUI on a touchscreen display) for inputting information or requesting various operations. Alternatively, the user I/O 699 and the display screen may be operated by a keyboard, a mouse, a remote control, voice recognition (e.g., through a speaker/microphone 699a), or eye-movement tracking, or a combination thereof.

Printer engine 694, scanner engine 695 and network interface 696 are otherwise conventional, and therefore, a detailed description of such conventional aspects is omitted in the interest of clarity and brevity.

The MFD 690 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

As discussed above, the MFD 690 may also operate as a device management apparatus (e.g. device management apparatus 101 of FIG. 1). The operation of such device management apparatus according to an exemplary embodiment is described supra with reference to FIG. 1.

Figure 7:
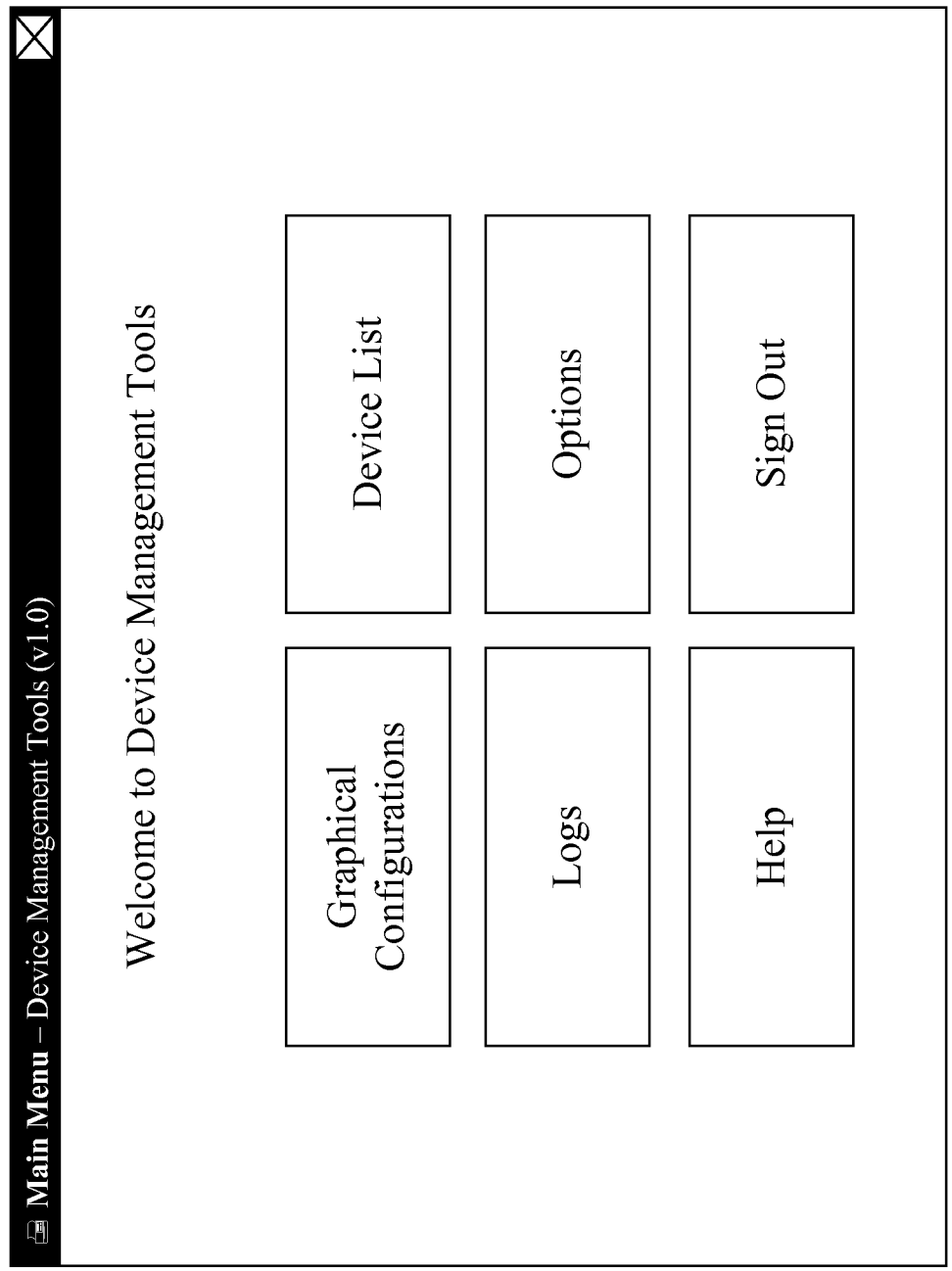
FIG. 7 shows a sample screenshot of a user interface displayed to the user, according to an exemplary embodiment.

FIG. 7 shows a screenshot of a main menu in an application software product for providing device management services, according to an exemplary embodiment. Such main menu screen is displayed on the terminal device of the user when the user successfully signs in, for example, by providing login credentials. In the example of FIG. 7, the main menu screen has the following buttons: "graphical configurations" for displaying the graphical configurations (e.g. customized view of the network environment, which includes graphs and tables), "device list" for displaying the list of network devices in the network environment, "logs" for displaying a log file which records various events that occur in the network environment managed by the device management application, "options" for allowing the user to configure various settings that govern the operation of the device management application, "help" for additional information about the application, and "sign out" for signing out of the device management application.

FIG. 8 shows a screenshot of a user interface (UI) displayed upon activating the "device list" button of FIG. 7, according to an exemplary embodiment. As shown in FIG. 8, a list of devices connected, either directly or indirectly, to the network (or networks accessible by the user) is displayed to the user. At the top of the screen, buttons are provided for returning to the main menu screen ("main menu"), adding a new device ("add device"), configuring one or more existing devices ("configure"), uninstalling one or more existing devices ("uninstall"), and obtaining additional details regarding the device list ("help").

The device list UI allows the user to select one or more devices from the list and configure or uninstall the selected devices. As shown in FIG. 8, the selection of a device is indicated by a checkmark in the leftmost column of the device list. Multiple devices may be configured or uninstalled at a time by selecting the plurality of devices that the user wishes to configure or uninstall and activating the "configure device" or "uninstall device" button.

For example, when the user activates the "configure device" button, a user interface for configuring the selected device is displayed to the user, as shown in FIG. 9A. In the example of FIG. 9A (e.g. the first user interface described in connection with FIG. 1), the device configuration UI includes a plurality of selectable tabs at the top, and each tab represents a category of device settings that can be configured by the user (e.g. "status" for viewing the various status items of the device, "print settings" for viewing and configuring the print settings of the device, "TCP/IP" for viewing and configuring the TCP/IP settings of the device, "SNMP" for viewing and configuring the SNMP settings of the device, and "firmware" for viewing and configuring the firmware settings of the device). In FIG. 9A, the "print settings" tab is selected, which provides numerous printing templates and parameters that can be configured by the user. For example, the settings available under each tab may be predetermined (e.g. stored in a table such as shown in FIG. 10B) and requested from the selected device by the monitoring engine unit.

The user can save a set of settings as a new template for future access by configuring the parameters displayed in the right portion of the UI and activating the "save as" button. Previously saved templates can be deleted by activating the "delete" button. If the user wishes to apply the current device settings to the currently selected device and to all other devices that are similar (e.g. same manufacturer and model), the "apply to all similar devices" checkbox can be checked before activating the "OK" bottom.

For example, when the "apply to all similar devices" checkbox is checked and the "OK" button is activated, the monitoring engine unit accesses a table including a list of devices and the corresponding device types, retrieves all the devices having the same device type as the device selected by the user, and causes the user-specified device settings to be written on each of such devices.

In the example of FIG. 9A, the value for each of the settings items (e.g. paper source, stapling, hole punching, etc.) reflect the current settings collected from the device, and the value may be changed by the user using the drop-down menus provided for each of the settings items.

Figure 9B:
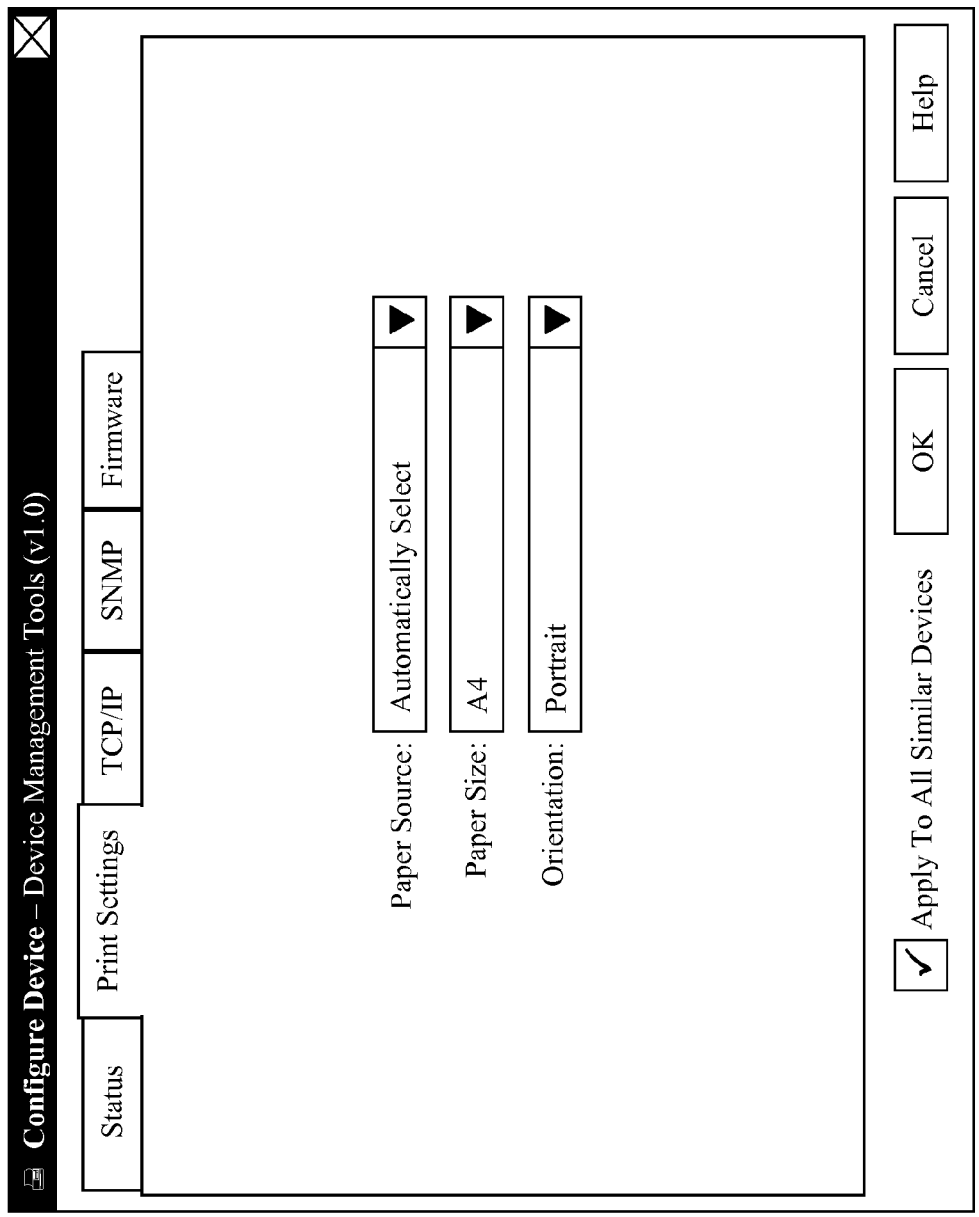

FIG. 9B shows an example in which the device settings displayed on the user interface is more limited (e.g. the second user interface described in connection with FIG. 1). For example, the user interface displayed in FIG. 9B is missing some of the settings items shown in FIG. 9A, and thus the number of settings that can be configured by the user is reduced. The example of FIG. 9B may illustrate the user interface displayed for the subset of the plurality of devices in the network system for which the information regarding the device settings items available is not as complete (e.g. less than 100%) as another subset of the plurality of devices (e.g. FIG. 9A). For example, the monitoring engine unit may query the management information base maintained for the selected device to determine the set of device settings available, and request the set of device settings from the selected device. Such query may utilize a protocol such as SNMP (Simple Network Management Protocol) (e.g. for standard MIBs or private MIBs) or any other interface or protocol.

Figure 9D:
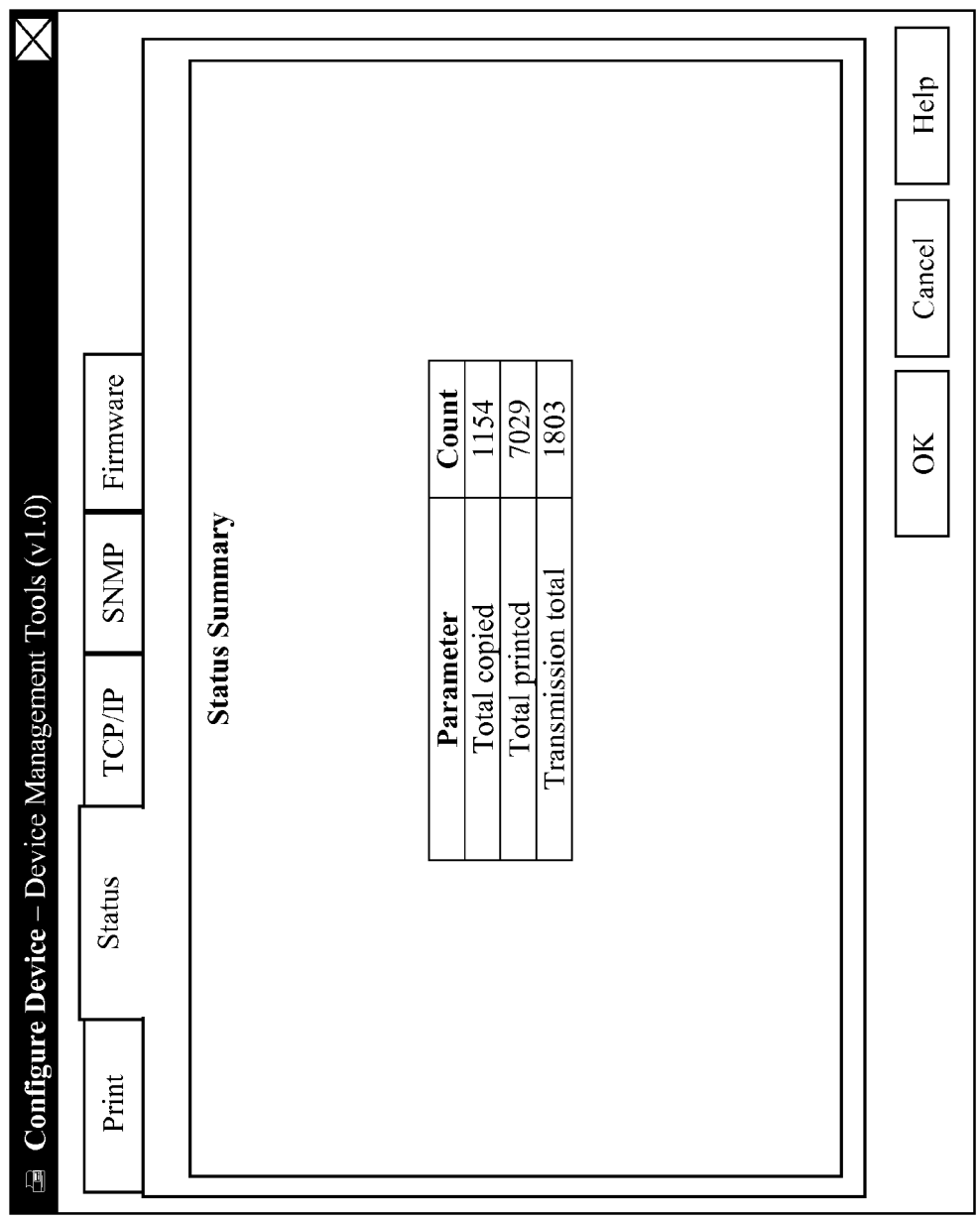

FIGS. 9C and 9D show user interface screens with the "status" tab selected for viewing a status summary of the selected device, according to another exemplary embodiment. As shown in the examples of FIGS. 9C and 9D, the information available to be displayed to the user may differ depending on the selected device. For example, the status summary displayed in FIG. 9C includes a greater amount of information than the status summary displayed in FIG. 9D.

The user interface shown in FIGS. 9A-9D is merely an example of how various device settings may be displayed for user configuration, and the device settings may be presented to the user in a variety of other different ways.

Figure 11:
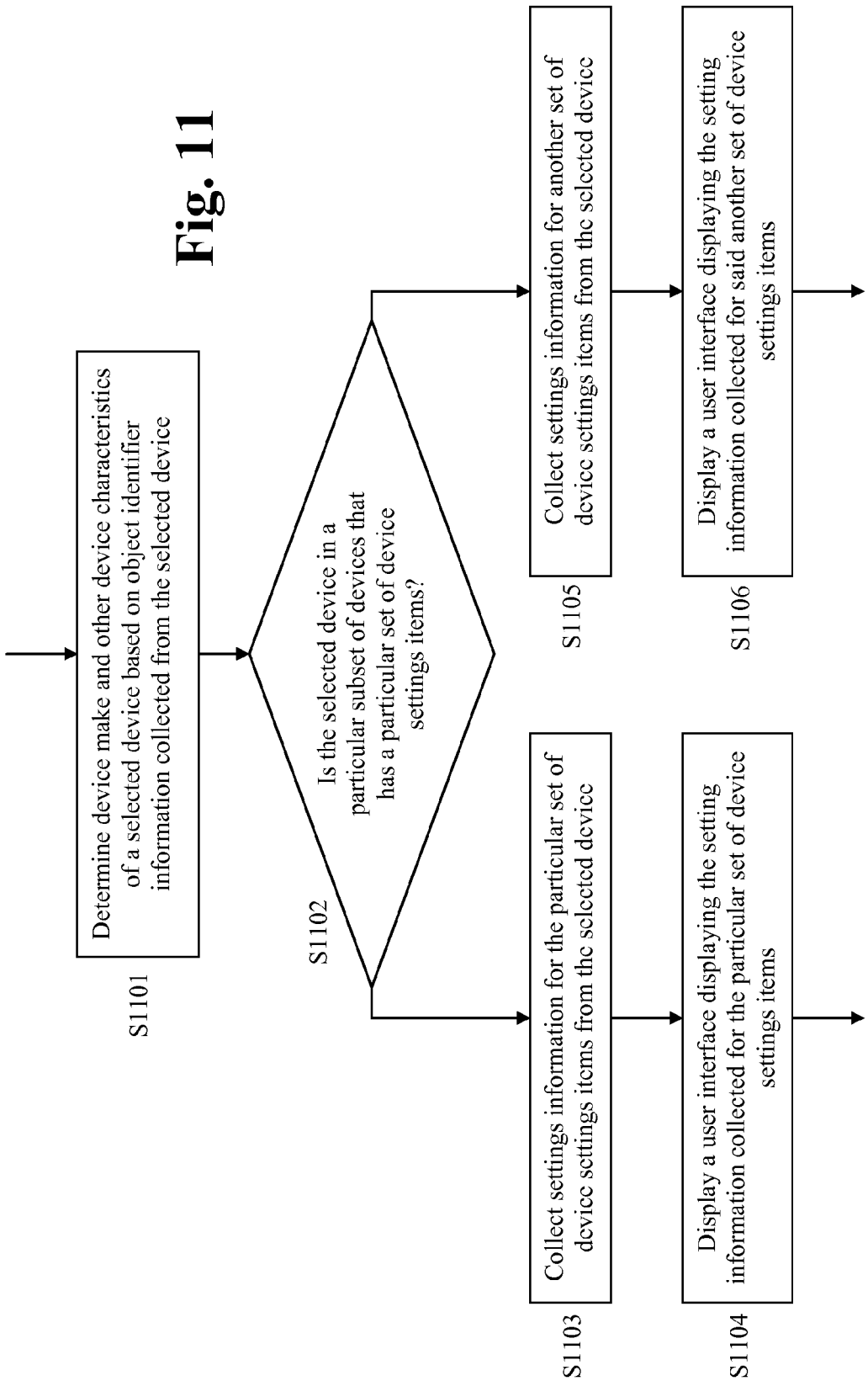
FIG. 11 shows a flowchart of a method of displaying settings information for user configuration, according to an exemplary embodiment.

Turning now to FIG. 11, there is shown a flowchart of a method of displaying settings information for user configuration, according to an exemplary embodiment.

After device make and other device characteristics of a selected device is determined based on the object identifier information collected from the selected device (step S1101), it is determined whether the selected device is in a particular subset of devices that has a particular set of device settings items (step S1102). For example, the particular subset of devices may include devices manufactured by a particular set of manufacturers (or sold by a particular set of vendors) for which a set of device settings items are known (e.g. stored in a table, such as shown in FIG. 10B, accessible by the monitoring engine unit to be used for determining what kind of device settings items can be retrieved from the selected device).

If it is determined that the selected device is in the particular subset of devices that has the particular set of device settings items (YES, S1102), settings information for the particular set of device settings items is collected from the selected device (step S1103), and a user interface displaying the settings information collected for the particular set of device settings items is displayed to the user (step S1104).

If it is determined that the selected device is not in the particular subset of devices that has the particular set of device settings items (NO, S1102), settings information for another set of device settings items is collected from the selected device (step S1105), and a user interface displaying the settings information collected for said another set of device settings items is displayed to the user (step S1106).

Figure 12:
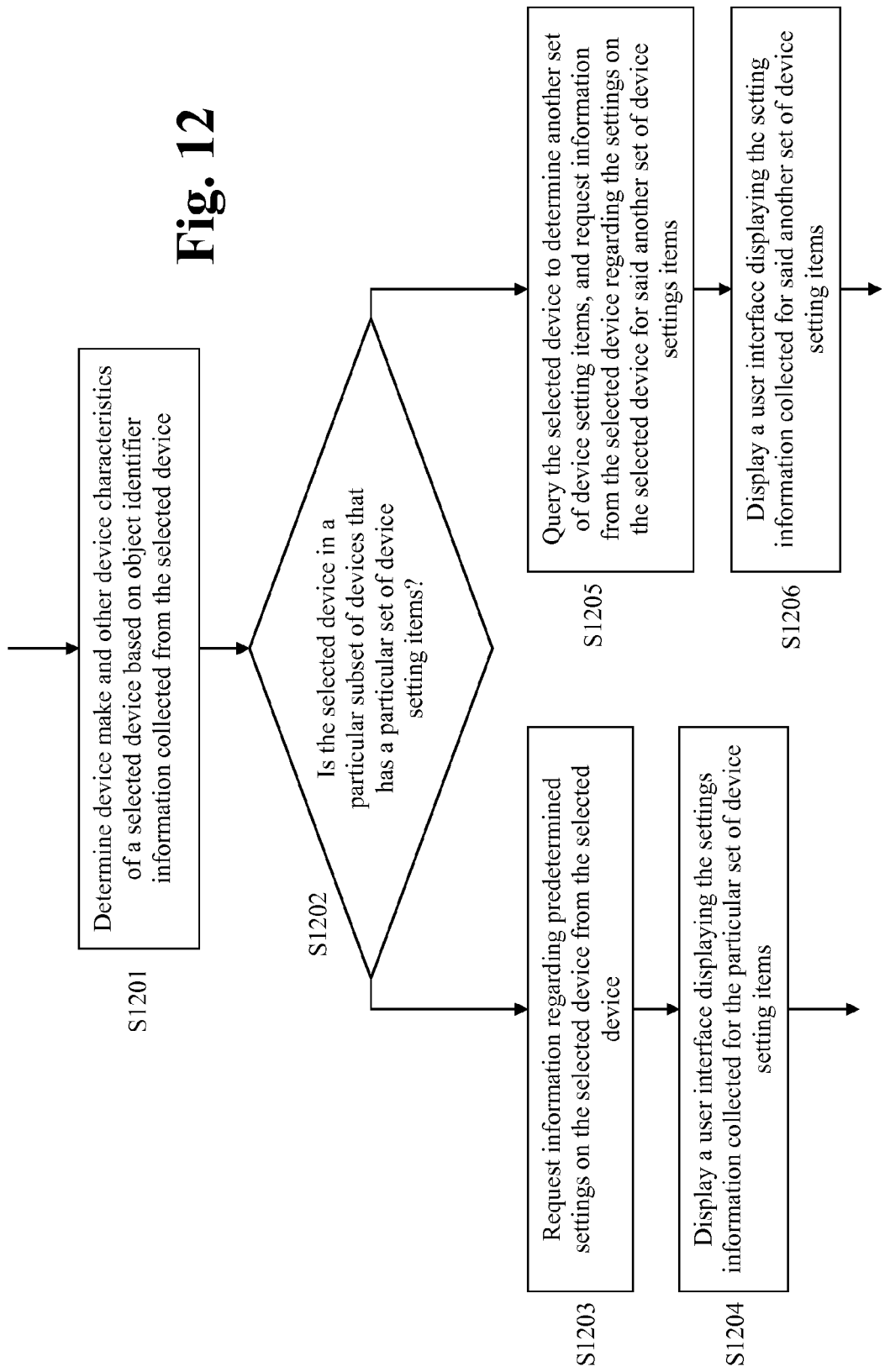
FIG. 12 shows a flowchart of a method of displaying settings information for user configuration, according to another exemplary embodiment.

Turning now to FIG. 12, there is shown a flowchart of a method of displaying settings information for user configuration, according to an exemplary embodiment.

After device make and other device characteristics of a selected device is determined based on the object identifier information collected from the selected device (step S1201), it is determined whether the selected device is in a particular subset of devices that has a particular set of device settings items (step S1202). For example, as discussed above, the particular subset of devices may include devices manufactured by a particular set of manufacturers (or sold by a particular set of vendors) for which a set of device settings items are known (e.g. stored in a table, such as shown in FIG. 10B, accessible by the monitoring engine unit to be used for determining what kind of device settings items can be retrieved from the selected device).

If it is determined that the selected device is in the particular subset of devices that has the particular set of device settings items (YES, S1202), information regarding predetermined settings (e.g. settings indicated by checkmarks in the table shown in FIG. 10B) on the selected device is requested from the selected device (step S1203), and a user interface displaying the settings information collected for the particular set of device settings items is displayed to the user (step S1204).

If it is determined that the selected device is not in the particular subset of devices that has the particular set of device settings items (NO, S1202), the selected device is queried to determine another set of device settings items, information regarding the settings on the selected device for said another set of device settings items is requested from the selected device (step S1205), and a user interface displaying the settings information collected for said another set of device settings items is displayed to the user (step S1206).

Figure 13:
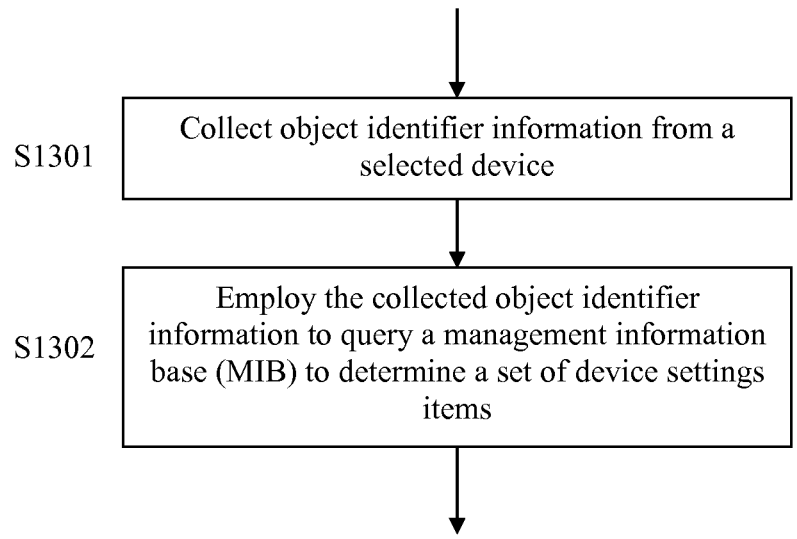
FIG. 13 shows a flowchart of a method of determining a set of device settings items, according to an exemplary embodiment.

Turning now to FIG. 13, there is shown a flowchart of a method of determining a set of device settings items, according to an exemplary embodiment.

After the object identifier information is collected from a selected device (step S1301), the collected object identifier information is employed to query a management information base (MIB) to determine the set of device settings items (step S1302). For example, as discussed above, the monitoring engine unit may query the management information base maintained for the selected device to determine the set of device settings available, and request the set of device settings from the selected device. Such query may utilize a protocol such as SNMP (Simple Network Management Protocol) (e.g. for standard MIBs or private MIBs) or any other interface or protocol. In another exemplary embodiment, the monitoring engine unit may determine, based on the collected object identifier information, a plugin to be used to collect settings items from the selected device, and retrieve the settings items from the selected device using the plugin.

Figure 15:
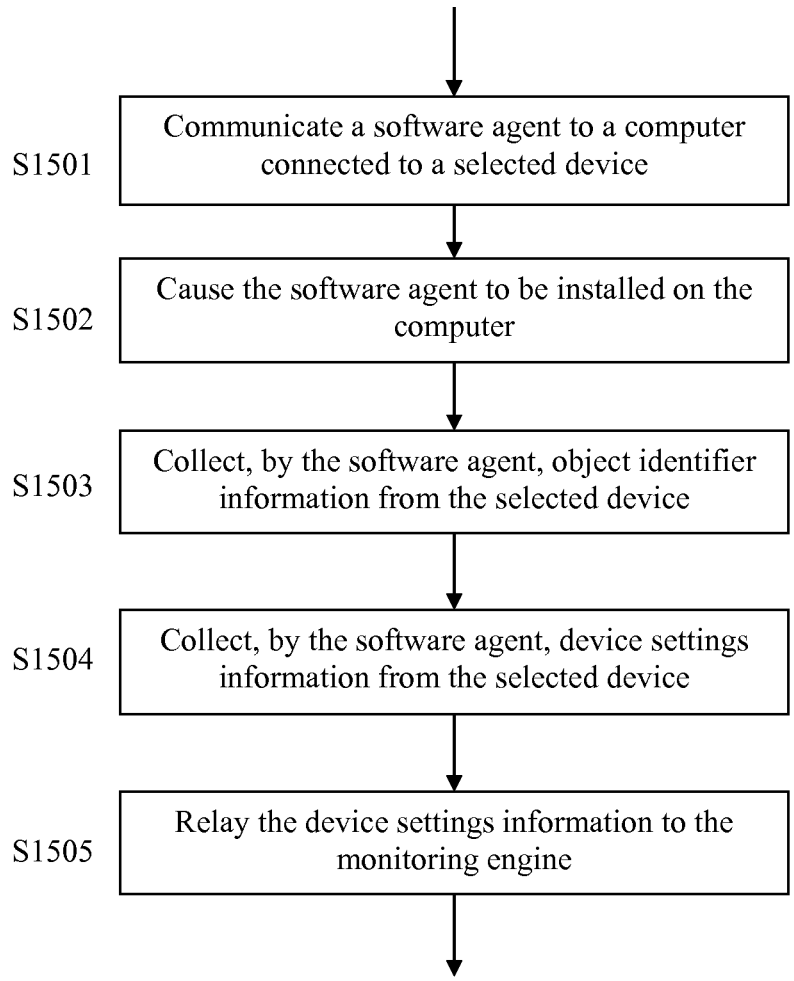
FIG. 15 shows a flowchart of a method of collecting device settings information, according to an exemplary embodiment.

Turning now to FIG. 15, there is shown a flowchart of a method of collecting device settings information, according to an exemplary embodiment.

After the monitoring engine unit communicates a software agent to a computer connected to a selected device (e.g. a USB-connected device) (step S1501), and causes the software agent to be installed on the computer (step S1502), the software agent collects object identifier information (step S1503) and device settings information from the selected device (step S1504). For example, as discussed above, the software agent may retrieve the object identifier information (e.g. object identifier, which uniquely identifies a managed object in a management information base hierarchy) from the selected device using an SNMP (Simple Network Management Protocol) command, and utilize the retrieved object identifier to determine the device make and other device characteristics of the selected device. Alternatively, the object identifiers may be provided by hardware manufacturers or may be found in OID (object identifier) repositories, where collections of MIB (management information base) trees and the respective OIDs can be accessed. The software agent may collect the device settings information from the selected device using the information extracted from the object identifier information, as discussed supra.

The device settings information collected from the selected device is relayed to the monitoring engine unit (step S1505).

By utilizing the software agent installed on the computer connected to a local device, the monitoring engine unit can retrieve device settings information from the local device, and the user can configure the settings for the local device.

Figure 16:
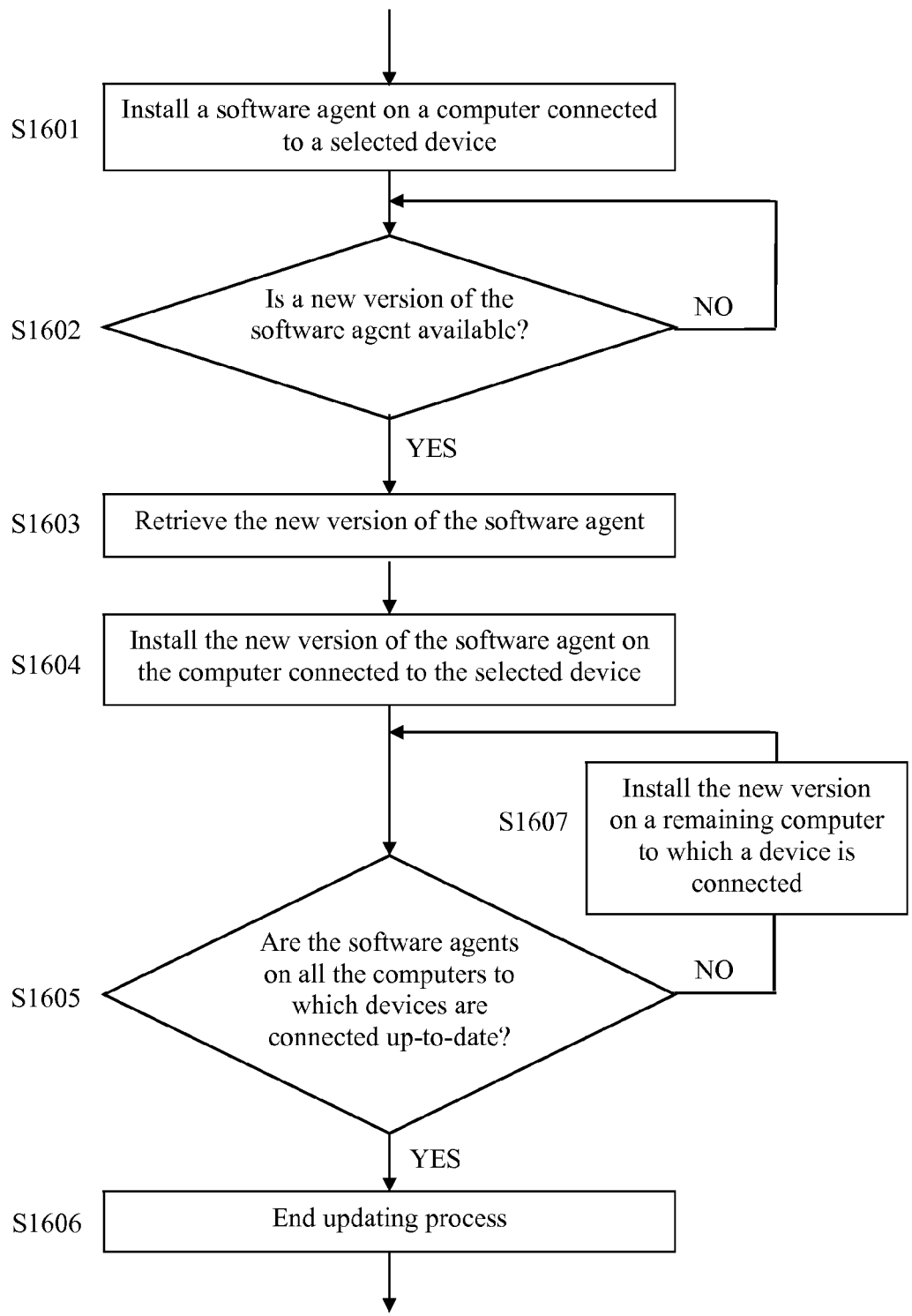
FIG. 16 shows a flowchart of a method of updating the software agent, according to an exemplary embodiment.

Turning now to FIG. 16, there is shown a flowchart of a method of updating the software agent, according to an exemplary embodiment.

After the software agent is installed on a computer connected to an IT device (e.g. as discussed with reference to FIG. 10B) (step S1601), it is checked whether a new version of the software agent is available (e.g. available for download from a web space) (step S1602). For example, the device management application may check for any updates available for the software agent installed on the computer every time the device management application is opened. Alternatively, the monitoring engine unit may periodically check for such updates.

If it is determined that a new version of the software agent is available (YES, S1602), the new version of the software agent is retrieved (step S1603), and installed on the computer connected to the IT device (step S1604).

For example, the monitoring engine unit may download the new version of the software agent from a website that maintains a copy of the latest version of the software agent for download.

In S1605, it is determined whether the software agent installed on each of the computers connected to IT devices is up-to-date, by, for example, checking the version number of the software agent installed on each computer. If it is determined that all the software agents are up-to-date (YES, S1606), the updating process is ended (step S1606). Otherwise, the new version of the software agent is installed on a remaining computer having an software agent that is out-of-date (step S1607), and such process is repeated until the software agents on all the computers having a local device (e.g. directly connected to the computer) connected thereto in the network environment are up-to-date.

Figure 17:
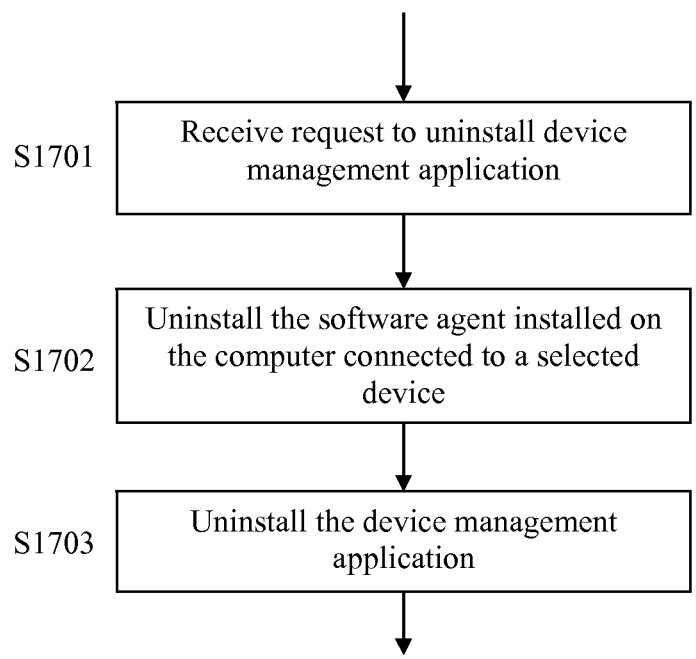
FIG. 17 shows a flowchart of a method of uninstalling a device management application, according to an exemplary embodiment.

Turning now to FIG. 17, there is shown a flowchart of a method of uninstalling a device management application, according to an exemplary embodiment.

When a user request to uninstall the device management application (e.g. installed on a terminal device of the user) is received (step S1701), the device management application causes the software agent installed on the plurality of computers having one or more local devices connected thereto to be uninstalled from each of the computers, by, for example, deleting the files associated with, and generated by, the software agent from the computers (step S1702). Then, the device management application is uninstalled (e.g. from the terminal of the user) as requested by the user (step S1703).

Since the software agent is automatically installed when the user wishes to configure the device settings of an IT device connected to the network via a terminal, and automatically uninstalled when the user wishes to uninstall the device management application, the user does not have to worry about installing or uninstalling the software agent. Indeed, in this exemplary embodiment, the software agent is transparent to the user. That is, the software agent functions without the user being aware of its presence.

TABLE 1

| | Network Device | | | | | USB |
| --- | --- | --- | --- | --- | --- | --- |
| | SNMP | | Web service GW | | FM | Connected Device |
| | | | NRS | Lexmark | Audit | MIB |
| | Standard MIB | RICOH Private MIB | RDH SOAP | SOAP (Only S/E/C) | Engine (Only S/E/C) | Engine (Only S/E/C) | Agent (OnlyS/ E/C) |
| Printer status | | | | | | |
| "System" status | ✓ | ✓ | | ✓ | ✓ | ✓ |
| "Printer" status | ✓ | ✓ | | ✓ | ✓ | ✓ |
| "Copy" status | | ✓ | | ✓ | | |
| "FAX" status | | ✓ | | ✓ | | |
| "Scanner" status | | ✓ | | ✓ | | |
| "System" status in detail | ✓ | ✓ | | ✓ | ✓ | ✓ |
| "Printer" status in detail | | ✓ | | ✓ | ✓ | ✓ |
| "Copy" status in detail | | ✓ | | ✓ | | |
| "FAX" status in detail | | ✓ | | ✓ | | |

TABLE 1-continued

| | Network Device | | | | | | USB Connected Device |
|---|---|---|---|---|---|---|---|
| | SNMP | | Web service GW | | Lexmark | FM Audit | MIB |
| | Standard MIB | RICOH Private MIB | RDH SOAP | NRS SOAP (Only S/E/C) | Engine (Only S/E/C) | Engine (Only S/E/C) | Agent (OnlyS/E/C) |
| "Scanner" status in detail | | ✓ | | | ✓ | | |
| <Paper feed tray> Name | ✓ | ✓ | | | ✓ | | ✓ |
| <Paper feed tray> Status | ✓ | ✓ | | | ✓ | | ✓ |
| <Paper feed tray> Size | ✓ | ✓ | | | ✓ | | ✓ |
| <Paper feed tray> Direction | ✓ | ✓ | | | ✓ | | ✓ |
| <Toner/ink>Name | | ✓ | | | ✓ | ✓ | (*1) |
| <Toner/ink> Status (remaining amount) | | ✓ | | | ✓ | ✓ | (*1) |
| <Output tray> Name | ✓ | ✓ | | | ✓ | | ✓ |
| <Output tray> Status | ✓ | ✓ | | | ✓ | | ✓ |
| <Option> | | ✓ | | | | | |
| <Remaining amount of document box> | | ✓ | | | | | |
| Printer in detail | | | | | | | |
| Vendor name | ✓ | | | | | ✓ | ✓ |
| WIM location | ✓ | | | | | ✓ | |
| <Device information> PPM | ✓ | ✓ | | | | | |
| <Device information> Monochrome/color | ✓ | | | | | | ✓ |
| <Device information> System version | | ✓ | | | ✓ | | ✓ |
| <Device information> Printer version | | ✓ | | | | | ✓ |
| <Device information> Serial number | ✓ | ✓ | | | ✓ | ✓ | ✓ |
| <Device information> Total memory | ✓ | ✓ | | | | ✓ | ✓ |
| <Device information> Data of resetting the counter to zero | | | | ✓ | | | |
| <Printer language> Name | | | | | | | |
| <Network I/F> Printer model | | | | | | | |
| <Network I/F> Device name | | | | | | | |
| <Network I/F> Comment | | | | | | | |
| <Network I/F> IP address | | | | | | | |
| <Network I/F> Subnet mask | | | | | | | |
| <Network I/F> MAC address | | | | | | | |
| <Network I/F> Host name | | | | | | | |
| <Network I/F> NIB version | | | | | | | |

TABLE 1-continued

| | Network Device | | | | | | USB |
| --- | --- | --- | --- | --- | --- | --- | --- |
| | SNMP | | Web service GW | | Lexmark | FM | Connected Device |
| | | | | NRS | | Audit | MIB |
| | Standard MIB | RICOH Private MIB | RDH SOAP | SOAP (Only S/E/C) | Engine (Only S/E/C) | Engine (Only S/E/C) | Agent (OnlyS/ E/C) |

<Network I/F>
NetWare print server
<Network I/F>
NetWare mode
Counter name list for billing
Billing counter FC counter (total)
MC counter (total)
FC counter (printer)
MC counter (printer)
FC Counter (A3/DLT)
MC Counter (A3/DLT)
Color copy
Bk copy
Color print
Bk print
Economy print
Bk in total
Color in total
Administrator counter Total
Copy: full-color
Copy: black-and-while
Copy: one-color
Copy: two-color
Printer: full-color
Printer: black-and-while
Printer: one-color
Printer: two-color
Color Coverage1
(0% <= X < 5%)
*GW + only
Color Coverage2
(5% <= X < 20%)
*GW + only
Color Coverage3
(20% <= X) *GW + only
FAX print: black-and-while
FAX print: one-color
A3/DLT
Double-side printing
A2
Transmission total: color
Transmission total: black-and-white
FAX transmission
Scanner transmission: color
Scanner transmission: black-and-white TABLE 1-continued

|  | Network Device | | | | | | USB |
|---|---|---|---|---|---|---|---|
|  | SNMP | | Web service GW | | Lexmark | FM | Connected Device |
|  | Standard MIB | RICOH Private MIB | RDH SOAP | NRS SOAP (Only S/E/C) | Engine (Only S/E/C) | Audit Engine (Only S/E/C) | MIB Agent (OnlyS/ E/C) |
| Lot setting | | | | | | | |
| Log transmission setting | | | | | | | |
| Trap setting | | | | | | | |
| Trap setting Firmware * S/E/C only | | | | | | | |
| Part No. (Part number) Module name Version Module ID SDK Platform | FTP/SFTP is used. | | | | | | |
| Version Stack size Heap size SDK Application | HTTP/HTTPS is used. | | | | | | |
| Name Version Product ID Toner | HTTP/HTTPS is used. | | | | | | |
| Color Supply serial No. Date of mounting Mount total counter Security Settings DOSS: Auto-Erase Execution Date/Time DOSS: Auto-Erase Setting DOSS: Deletion Method DOSS: Erase Frequency HDD Encryption | | | | | | | |

Table 1 is an example of predetermined device settings items associated with particular subsets of the plurality of devices in an IT environment. As shown in Table 1, varying degrees of information are available for the various types of IT devices (e.g. RICOH devices, Lexmark devices, and other USB-connected devices). The information contained in Table 1 is merely exemplary, and the predetermined device settings items may include a variety of others not shown in Table 1, for any arbitrary number of manufacturers/vendors.

In the aforementioned aspects of the present disclosure, even when the plurality of IT devices in an IT environment are manufactured by different companies (and thus possess different sets of device settings available on the IT devices), a single device management tool can collect device settings information from the various IT devices and allow users to modify device settings on such IT devices.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A device management apparatus configured to monitor device status of, and collect device settings information from, a plurality of devices, said device management apparatus comprising:
    a communication part that communicates with any selected device amongst the plurality of devices;
    a monitoring engine part that determines device make and other device characteristics of the selected device based on object identifier information collected from the selected device, and determines based on one or more of the device make and other device characteristics of the selected device whether the selected device is in a particular subset of the plurality of devices that has a particular set of device settings items or whether the selected device is in another subset of the plurality of devices that has another set of device settings items that are different from said particular set of device settings items; and a user interface part that causes a specified user interface to be provided to a device setting terminal, wherein in a case that the monitoring engine part determines based on said one or more of the device make and other device characteristics that the selected device is in the particular subset of the plurality of devices, the monitoring engine part collects, from the selected device, settings information for the particular set of device settings items, and said user interface part causes a first user interface to be provided to the device setting terminal, said first user interface displaying the settings information collected, from the selected device, for the particular set of device settings items corresponding to the particular subset of the plurality of devices, and in a case that the monitoring engine part determines based on said one or more of the device make and other device characteristics that the selected device is in said another subset of the plurality of devices, the monitoring engine part collects settings information for said another set of device settings items, from the selected device, and said user interface part causes a second user interface to be provided to the device setting terminal, said second user interface displaying the collected settings information for said another set of device settings items corresponding to said another subset of the plurality of devices.

2. The device management apparatus of claim 1, wherein said first user interface permits a user operating the first user interface to change any one or more settings amongst the particular set of device settings items, and said second user interface permits a user operating said second user interface to change any one or more settings amongst said another set of device settings items.

3. The device management apparatus of claim 1, wherein the particular set of device settings items associated with the particular subset of the plurality of devices is predetermined, and the monitoring engine part requests information from the selected device regarding settings on the selected device for the particular set of device settings items.

4. The device management apparatus of claim 1, wherein in the case that the monitoring engine part determines that the selected device is in said another subset of the plurality of devices, the monitoring engine part queries the selected device to determine said another set of device settings items, and requests information from the selected device regarding settings on the selected device for said another set of device settings items.

5. The device management apparatus of claim 1, wherein in the case that the monitoring engine part determines that the selected device is in said another subset of the plurality of devices, the monitoring engine part employs the object identifier information collected from the selected device, to query a management information base to determine said another set of device settings items.

6. The device management apparatus of claim 1, wherein the monitoring engine part is configured by a first plugin to collect the settings information through a network from the selected device indicating settings on the selected device for the particular set of device settings items, and to trigger said user interface part to cause the first user interface to be provided to display the settings information collected, from the selected device, for the particular set of device settings items, in the case that the selected device is in the particular subset of the plurality of devices, and the monitoring engine part is configured by a second plugin to collect the settings information for said another set of device settings items, from the selected device through the network, and to trigger said user interface part to cause the second user interface to be provided to display the collected settings information for said another set of device settings items, in a case that the selected device is in said another subset of the plurality of devices.

7. The device management apparatus of claim 1, wherein the monitoring engine part communicates a software agent to a computer connected to the selected device, and cause the software agent to be installed on the computer, transparent to a user of the computer, and the software agent collects the object identifier information from the selected device, and collects the device settings information from the selected device and relays the device settings information collected from the selected device to the monitoring engine part.

8. The device management apparatus of claim 7, wherein in a case that a newer version of the software agent is available, the monitoring engine part communicates the newer version to the computer connected to the selected device, and causes the software agent on the computer to be replaced by the newer version, transparent to the user of the computer.

9. A system for managing a plurality of devices in a network environment, said system comprising:

device monitoring engine that monitors device status of, and collect device settings information from, a plurality of devices, wherein the device monitoring engine determines device make and other device characteristics of a selected device based on object identifier information collected from the selected device, and determines based on one or more of the device make and other device characteristics of the selected device whether the selected device is in a particular subset of the plurality of devices that has a particular set of device settings items or whether the selected device is in another subset of the plurality of devices that has another set of device settings items that are different from said particular set of device settings items; and a device management application provided through a network to a device setting terminal, to provide a specified user interface on the device setting terminal, wherein in a case that the device monitoring engine determines based on said one or more of the device make and other device characteristics that the selected device is in the particular subset of the plurality of devices, the device monitoring engine collects from the selected device settings information for the particular set of device settings items, and said device management application causes a first user interface to be provided on the device setting terminal, said first user interface displaying the settings information collected, from the selected device, for the particular set of device settings items corresponding to the particular subset of the plurality of devices, and in a case that the device monitoring engine determines based on said one or more of the device make and other device characteristics that the selected device is in said another subset of the plurality of devices, the device monitoring engine collects settings information for said another set of device settings items, from the selected device, and said device management application causes a second user interface to be provided on the device setting terminal, said second user interface displaying the collected settings information for said another set of device settings items corresponding to said another subset of the plurality of devices.

10. The system of claim 9, wherein said first user interface permits a user operating the first user interface to change any one or more settings amongst the particular set of device settings items, and said second user interface permits a user operating said second user interface to change any one or more settings amongst said another set of device settings items.

11. The system of claim 9, wherein the particular set of device settings items associated with particular subset of the plurality of devices is predetermined, and the device monitoring engine requests information from the selected device regarding settings on the selected device for the particular set of device settings items.

12. The system of claim 9, wherein in the case that the device monitoring engine determines that the selected device is in said another subset of the plurality of devices, the device monitoring engine queries the selected device to determine said another set of device settings items, and requests information from the selected device regarding settings on the selected device for said another set of device settings items.

13. The system of claim 9, wherein in the case that the device monitoring engine determines that the selected device is in said another subset of the plurality of devices, the device monitoring engine employs the object identifier information collected from the selected device, to query a management information base to determine said another set of device settings items.

14. The system of claim 9, wherein
the device monitoring engine is configured by a first plugin to collect the settings information through the network from the selected device indicating settings on the selected device for the particular set of device settings items, and to trigger said device management application to cause the first user interface to be provided to display the settings information collected, from the selected device, for the particular set of device settings items, in the case that the selected device is in the particular subset of the plurality of devices, and
the device monitoring engine is configured by a second plugin to collect the settings information for said another set of device settings items, from the selected device through the network, and to trigger said device management application to cause the second user interface to be provided to display the collected settings information for said another set of device settings items, in a case that the selected device is in said another subset of the plurality of devices.

15. The system of claim 9, wherein
the device monitoring engine communicates a software agent through the network to a computer connected to the selected device, and causes the software agent to be installed on the computer, transparent to a user of the computer, and
the software agent collects the object identifier information from the selected device, collects the device settings information from the selected device and relays the device settings information collected from the selected device to the device monitoring engine.

16. A method for managing any selected device amongst a plurality of devices, said method comprising:
(a) monitoring device status of the plurality of devices through a network;
(b) providing a device management application through the network to a device setting terminal, to provide a specified user interface on the device setting terminal, the user interface permitting a user of the device setting terminal to select a specified device amongst the plurality of devices;
(c) determining device make and other device characteristics of the specified device based on object identifier information collected from the specified device, and determining based on one or more of the device make and other device characteristics of the specified device whether the specified device is in a particular subset of the plurality of devices that has a particular set of device settings items or whether the specified device is in another subset of the plurality of devices that has another set of device settings items that are different from said particular set of device settings items; and
(d) collecting from the specified device, (i) in a case that it is determined in (c) that the specified device is in the particular subset of the plurality of devices, settings information for the particular set of device settings items, and (ii) in a case that it is determined in (c) that the specified device is in said another subset of the plurality of devices, settings information for said another set of device settings items; and
(e) causing said device management application to provide on the device setting terminal, (iii) in the case that it is determined in (c) that the specified device is in the particular subset of the plurality of devices, a first user interface displaying the settings information collected in (d), from the specified device, for the particular set of device settings items corresponding to the particular subset of the plurality of devices, and (iv) in the case that it is determined in (c) that the specified device is in said another subset of the plurality of devices, a second user interface displaying the collected settings information for said another set of device settings items corresponding to said another subset of the plurality of devices.

17. The method of claim 16, further comprising:
permitting a user operating the first user interface to change any one or more settings amongst the particular set of device settings items; and
permitting a user operating the second user interface to change any one or more settings amongst said another set of device settings items.

18. The method of claim 16, further comprising:
requesting, in the case that it is determined in (c) that the specified device is in the particular subset of the plurality of devices, information from the specified device regarding settings on the specified device for the particular set of device settings items, the particular set of device settings items being predetermined; and
querying, in the case that it is determined in (c) that the specified device is in said another subset of the plurality of devices, the specified device to determine said another set of device settings items, and requesting information from the specified device regarding settings on the specified device for said another set of device settings items.

19. The method of claim 16, further comprising:
employing, in the case that it is determined in (c) that the specified device is in said another subset of the plurality of devices, the object identifier information collected from the specified device, to query a management information base to determine said another set of device settings items.

20. The method of claim 16, further comprising:
communicating a software agent to a computer connected to the specified drive;
causing the software agent to be installed on the computer;
collecting, by the software agent, the object identifier information from the specified device;
collecting, by the software agent, the device settings information from the specified device; and
receiving the device settings information collected from the specified device from the software agent.

* * * * *